United States Patent
Miyazawa

(10) Patent No.: US 6,542,518 B1
(45) Date of Patent: Apr. 1, 2003

(54) TRANSPORT STREAM GENERATING DEVICE AND METHOD, AND PROGRAM TRANSMISSION DEVICE

(75) Inventor: Satoshi Miyazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/194,264

(22) PCT Filed: Mar. 25, 1998

(86) PCT No.: PCT/JP98/01336

§ 371 (c)(1),
(2), (4) Date: Nov. 23, 1998

(87) PCT Pub. No.: WO98/43423

PCT Pub. Date: Oct. 1, 1998

(30) Foreign Application Priority Data

Mar. 25, 1997 (JP) .............................................. 9-071833

(51) Int. Cl.⁷ .............................. H04J 3/22; H04N 7/12
(52) U.S. Cl. ...................... 370/468; 370/487; 370/537; 348/423.1
(58) Field of Search ................................ 370/458, 462, 370/465, 468, 537, 538, 474, 486, 487, 493, 498; 348/423.1

(56) References Cited

U.S. PATENT DOCUMENTS 5,561,466 A * 10/1996 Kiriyama .................... 348/423
5,751,356 A * 5/1998 Suzuki ........................ 348/390
5,757,802 A * 5/1998 Yoo ........................... 348/423.1
5,918,020 A * 6/1999 Blackard et al. ........ 395/200.58
6,049,551 A * 4/2000 Hinderks et al. ........... 370/468
6,157,674 A * 12/2000 Oda et al. .................... 375/240
6,172,988 B1 * 1/2001 Tiernan et al. .............. 370/473
6,212,201 B1 * 4/2001 Hinderks et al. ........... 370/468

* cited by examiner

*Primary Examiner*—Min Jung
(74) *Attorney, Agent, or Firm*—Frommer Lawrence & Haug LLP; William S. Frommer; Darren M. Simon

(57) ABSTRACT

Each of the data amount of a video stream multiplexed in one video frame period and the data amount of an audio stream multiplexed in a predetermined period is almost constant in any video frame period. The data amount of a transport stream generated in one video frame period is almost constant in any video frame period. In addition, corresponding to a target video encoding rate and a target audio encoding rate, schedule data for multiplexing a video stream and an audio stream is generated. Corresponding to the schedule data, a video stream and an audio stream are multiplexed and output as a transport stream to a decoding unit so that an SDT buffer of the decoding unit does not overflow.

10 Claims, 15 Drawing Sheets

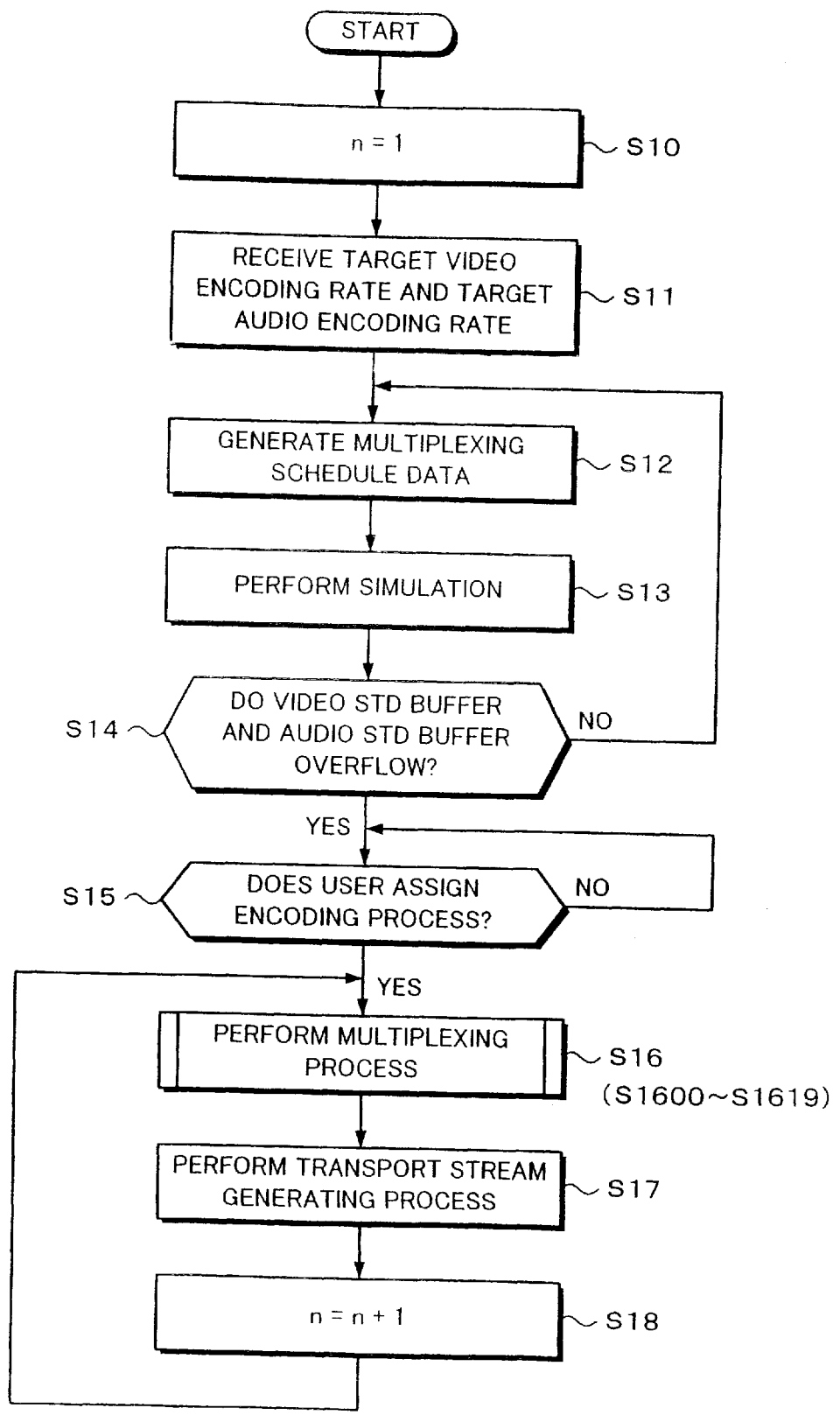

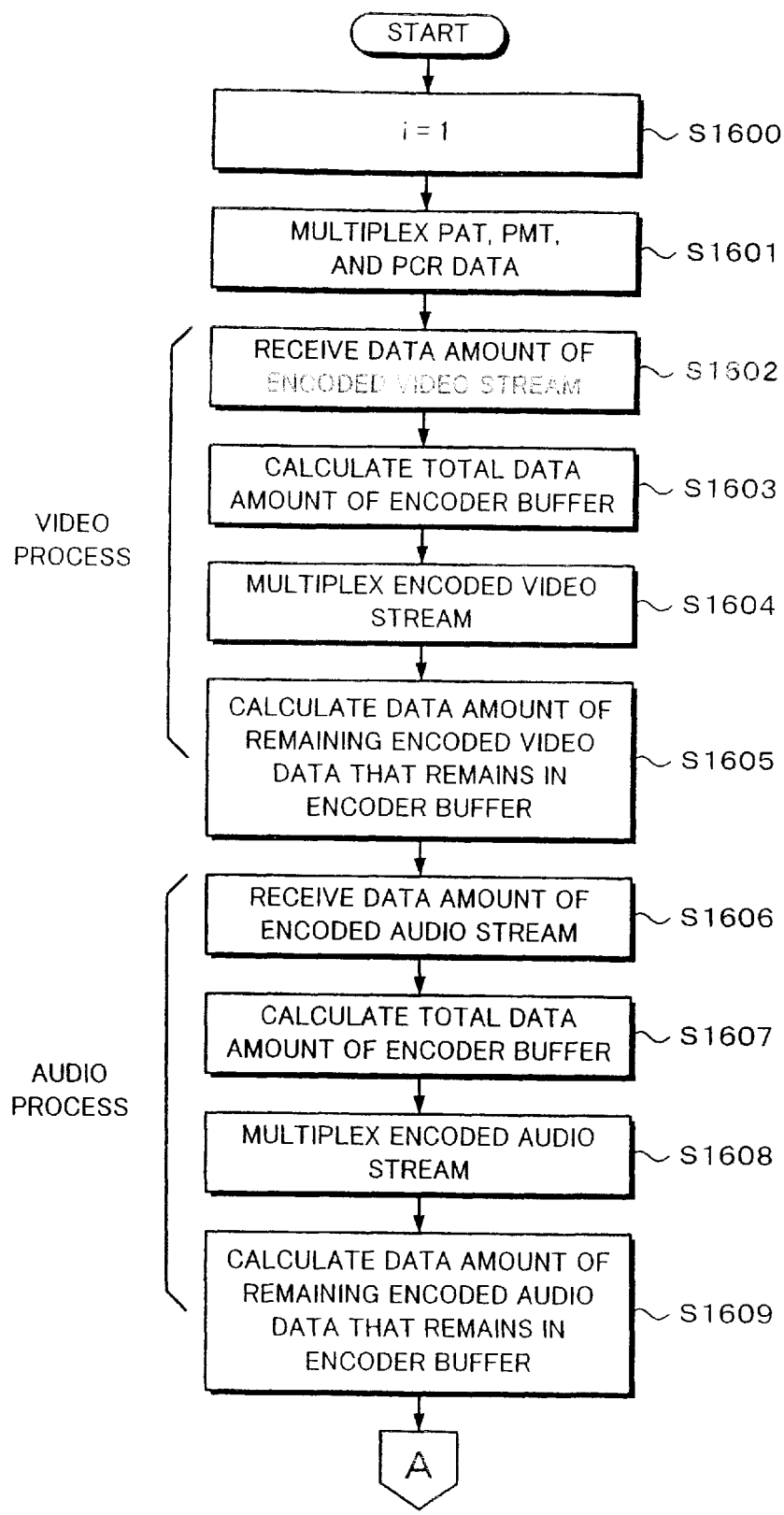

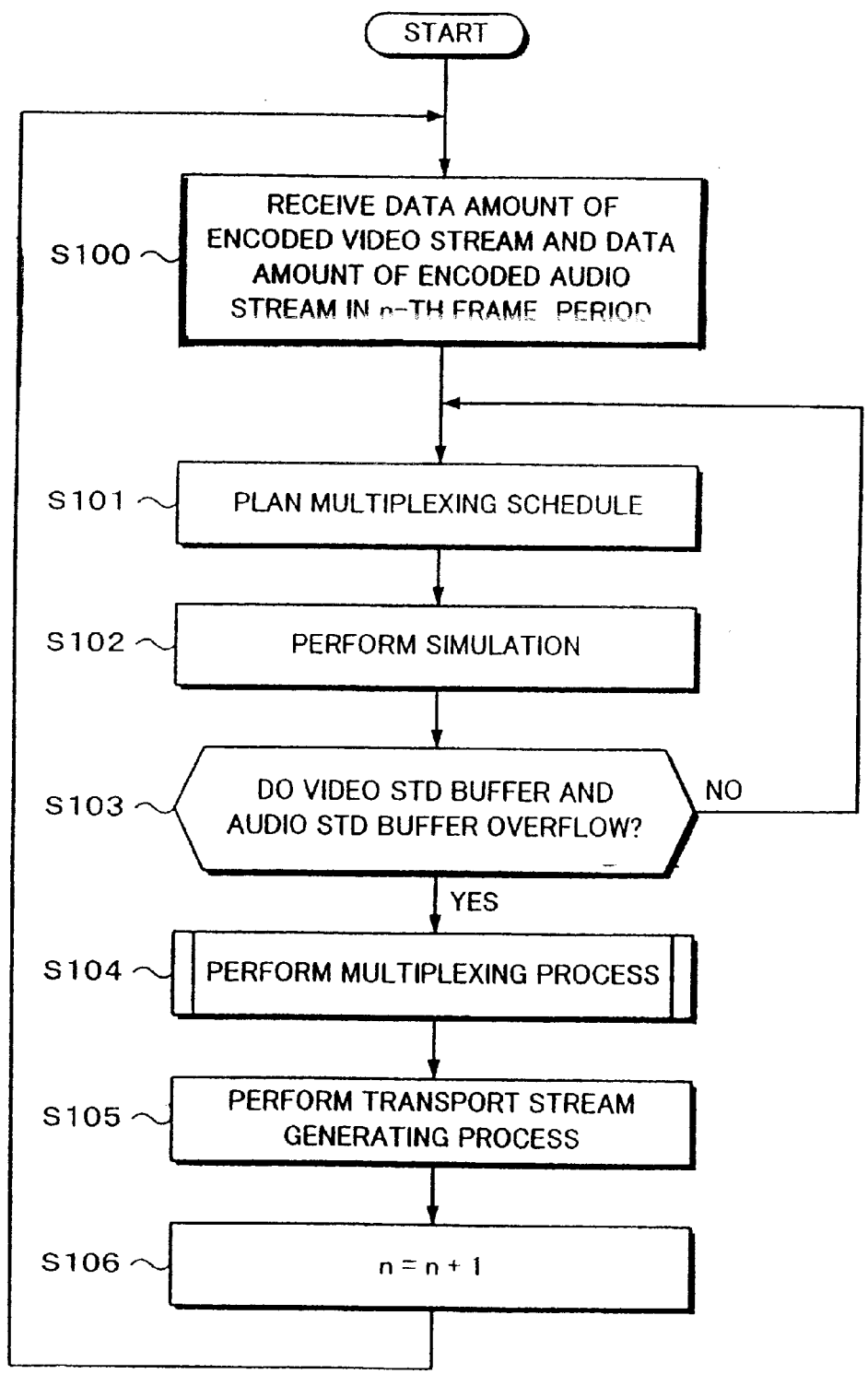

TRANSPORT STREAM GENERATING DEVICE AND METHOD, AND PROGRAM TRANSMISSION DEVICE

TECHNICAL FIELD

The present invention relates to a transport generating apparatus for multiplexing video data and audio data and generating a transport stream corresponding to MPEG standard, and method thereof, and a program transmitting apparatus for transmitting a plurality of programs.

RELATED ART

In recent years, a digital satellite broadcasting system and a cable broadcasting system that transmit compressed video signals corresponding to MPEG2 standard have been proposed and are being introduced all over the world. In the broadcasting world, DVB (Digital Video Broadcasting) standard proposed by an organization named DVB that was established for developing and standardizing a next-generation broadcasting system in Europe in around 1993 has become a defacto standard in digital broadcasting systems at the present time.

In the transmitting method corresponding to the DVB standard, video data and audio data contained in a program to be transmitted are encoded and thereby an encoded video stream and an encoded audio stream are generated. The encoded video stream and the encoded audio stream are converted into a transport stream that is transmitted. In other words, a transport stream is data of which an encoded video stream and an encoded audio stream are multiplexed.

To generate a transport stream of which an encoded video stream and an encoded audio stream have been multiplexed, a multiplexing unit that has an encoding function and a multiplexing function has been developed. In a conventional multiplexing unit, a video stream and a audio stream are multiplexed in a multiplexing period that is asynchronous with a frame period of the video stream and a frame period of the audio stream.

For example, when a video stream with a frame period of 33 msec and an audio stream with a frame period of 24 msec are multiplexed as shown in FIG. 13, in a conventional multiplexing unit, the video stream and the audio stream are multiplexed with the video frame period.

Next, with reference to FIG. 13, the conventional multiplexing process will be described. As shown in FIG. 13, in the first video frame period, an encoded video frame V1 encoded in the first video frame period and encoded audio streams A1 and A2 encoded in the first video frame period are multiplexed. In the second video frame period, an encoded video stream V2 encoded in the second video frame period and an encoded audio stream A3 encoded in the second video frame period are multiplexed. In each video frame, such a multiplexing process is repeated. Thus, as is clear from FIG. 13, the data amount of the first transport stream generated in the first video frame period is relatively large. In contrast, the data amount of the second transport stream T2 generated in the second video frame period is relatively small. In other words, in the conventional multiplexing process, the data amount of a transport stream generated varies in each video frame period.

To generate transport streams in such a manner that an STD (System Target Decoder) buffer of a decoder of a receiving unit that receives video streams and audio streams is prevented from overflowing, the conventional multiplexing unit that performs such a multiplexing process should perform simulations for the multiplexing process in various video frame periods. The STD buffer is a virtual buffer used to perform a decoding process for transport streams and to describe semantics of the transport streams.

Next, with reference to a flow chart shown in FIG. 14, a conventional process for generating a transport stream will be described.

At step S100, an encoded video stream V1 is received from a video encoder in the first video frame period. In addition, encoded audio streams A1 and A2 are received from an audio encoder in the first video period.

At step S101, before the encoded video stream V1 and the encoded audio streams A1 and A2 are multiplexed and a first transport stream T1 is generated in the first video frame period, one multiplexing schedule on which the video stream V1 and the audio streams A1 and A2 are multiplexed is planed.

At step S102, a transport stream is generated corresponding to the multiplexing schedule planed at step S101. A simulation is performed for determining whether or not the transport stream transmitted to a decoding unit causes a video STD buffer and an audio STD buffer of the decoder to overflow.

At step S103, corresponding to the result of the simulation, it is determined whether or not the video STD buffer and the audio STD buffer of the decoding unit overflow. When the determined result is Yes (namely, both the audio STD buffer and the video STD buffer do not overflow), the flow advances to step S104.

At step S104, the encoded video stream V1 and the encoded audio streams A1 and A2 are multiplexed corresponding to the multiplexing schedule planed at step S101.

At step S105, a first transport stream T1 is generated with the multiplexed streams.

When the determined result at step S103 is No (namely, the video STD buffer and the audio STD buffer of the decoding unit overflow), the flow returns to step S101. At step S101, another multiplexing schedule is planed. The steps S101, S102, and S103 are repeated until the determined result at step S103 becomes "Yes".

At step S106, "n" is incremented so as to generate a transport stream T2 in the second video frame period. Thereafter, the flow returns to step S100.

As is clear from the flow chart of the conventional transport generating process shown in FIG. 14, a process for planning a new multiplexing schedule and performing a simulation corresponding to the planed schedule should be performed in each video frame period. This is because the data amount of encoded video data and the data amount of encoded audio data vary in each video frame period as described in FIG. 13.

Moreover, in the simulating process, it is necessary to virtually determine whether the video STD buffer and the audio STD buffer overflow. Thus, the algorithm of the simulation becomes very complicated. Consequently, it takes a very long time to perform the simulation.

As described above, in the conventional unit, it takes a very long calculation time for processing transport streams. Thus, a supplied program cannot be multiplex-transmitted on real time basis. Especially, in digital satellite broadcasting systems and digital ground wave broadcasting systems, live programs are required to be transmitted on real time basis. However, in the transport generating algorithm of the conventional unit, it is difficult to transmit such live programs on real time basis.

DISCLOSURE OF THE INVENTION

The present invention is made from the above-described point of view. An object of the present invention is to generate a transport stream on real time basis in such a manner that an STD buffer of a decoding unit does not overflow.

In the transport stream generating apparatus according to the present invention, each of the data amount of an encoded video stream multiplexed in one video frame and the data amount of an encoded audio frame multiplexed in a predetermined period is almost constant in any video frame period. In addition, the data amount of a transport stream generated in one video frame period is almost constant in any video frame period.

Thus, the data amount of a transport stream that is output from the transport stream generating apparatus is constant in any frame period. Consequently, in the transport stream generating apparatus according to the present invention, it is not necessary to perform a simulation for determining whether or not a STD buffer of a decoding unit overflows. Thus, the transport stream generating apparatus according to the present invention can generate a transport stream faster than the conventional apparatus that requires a simulation. In addition, the apparatus according to the present invention can generate a transport stream on real time basis.

In the transport stream generating apparatus according to the present invention, schedule data for multiplexing an encoded video stream and an encoded audio stream is generated corresponding to a target video encoding rate and a target audio encoding rate. When an encoded video stream and an encoded audio stream are multiplexed corresponding to the generated schedule data and the multiplexed stream is transmitted as a transport stream to a decoding unit, the multiplexing process is performed in such a manner that the SDT buffer of the decoding unit does not overflow. Thus, in the transport stream generating apparatus according to the present invention, such schedule data is generated. In any video frame period, the multiplexing process is performed corresponding to the schedule data. Thus, the SDT buffer of the decoding unit is easily prevented from overflowing. In other words, unlike with the conventional apparatus, in the transport stream generating apparatus according to the present invention, it is not necessary to perform a complicated process such as a simulation corresponding to a planed schedule for each video frame.

In the transport stream generating apparatus according to the present invention, the schedule data is generated so that each of the data amount of an encoded video stream multiplexed in one video frame and the data amount of an encoded audio stream multiplexed in a predetermined period is almost constant in any video frame period and that the data amount of a transport stream generated in one video frame is almost constant in any video frame period. In other words, in the transport stream generating apparatus according to the present invention, the multiplexing process can be performed corresponding to the schedule data with preventing the STD buffer of the decoding unit from overflowing.

The first aspect of the present invention is a transport stream generating apparatus for generating a transport stream for transmitting source video data and source audio data, comprising an encoding means for encoding the source video data and the source audio data corresponding to an assigned video encoding rate and an assigned audio encoding rate so as to generate an encoded video stream and an encoded audio stream, respectively, a multiplexing means for multiplexing the encoded video stream and the encoded audio stream in each predetermined period, a transport stream generating means for generating the transport stream with the multiplexed stream of the video stream and the audio stream, and a controlling means for controlling the encoding means, the multiplexing means, and the transport stream generating means so that each of the data amount of the encoded video stream multiplexed in the predetermined period and the data amount of the encoded audio stream multiplexed in the predetermined period is almost constant in any predetermined period.

The second aspect of the present invention is a transport stream generating apparatus for generating a transport stream for transmitting source video data and source audio data, comprising an encoding means for encoding the source video data and the source audio data corresponding to an assigned video encoding rate and an assigned audio encoding rate so as to generate an encoded video stream and an encoded audio stream, respectively, a multiplexing means for multiplexing the encoded video stream and the encoded audio stream in each predetermined period, a transport stream generating means for generating the transport stream with the multiplexed stream of the video stream and the audio stream, and a controlling means for controlling the encoding means, the multiplexing means, and the transport stream generating means so that each of the data rate of the encoded video stream multiplexed as a transport stream in the predetermined period and the data rate of the encoded audio stream multiplexed as the transport stream in the predetermined period is almost constant in any predetermined period.

The third aspect of the present invention is a transport stream generating apparatus for generating a transport stream for transmitting source video data and source audio data, comprising an encoding means for encoding the source video data and the source audio data corresponding to an assigned video encoding rate and an assigned audio encoding rate so as to generate an encoded video stream and an encoded audio stream, respectively, a multiplexing means for multiplexing the encoded video stream and the encoded audio stream in each predetermined period, a transport stream generating means for generating the transport stream with the multiplexed stream of the video stream and the audio stream, and a controlling means for controlling the encoding means, the multiplexing means, and the transport stream generating means so that the data rate of the transport stream is almost constant in any predetermined period.

The fourth aspect of the present invention is a transport stream generating apparatus for generating a transport stream for transmitting source video data and source audio data, comprising a transport stream generating means for multiplexing the encoded video stream and the encoded audio stream in each predetermined period so as to generate the transport stream, a schedule generating means for generating a schedule for multiplexing an encoded video stream and an encoded audio stream corresponding to the assigned video encoding rate and the assigned audio encoding rate, and a controlling means for controlling the transport stream generating means so as to perform a multiplexing process corresponding to the multiplexing schedule in any predetermined period.

The fifth aspect of the present invention is a transport stream generating method for generating a transport stream with source video data and source audio data, comprising the steps of encoding the source video data and the source audio data corresponding to an assigned video encoding rate and an assigned audio encoding rate, respectively, multiplexing the encoded video stream and the encoded audio stream in each predetermined period so that the data amount of the multiplexed encoded video stream is almost constant in any predetermined period and that the data amount of the multiplexed encoded audio stream is almost constant in any predetermined period, and generating the transport stream with a multiplexed stream of the encoded video stream and the encoded audio stream.

The sixth aspect of the present invention is a transport stream generating method for generating a transport stream with source video data and source audio data, comprising the steps of encoding the source video data and the source audio data corresponding to an assigned video encoding rate and an assigned audio encoding rate, respectively, multiplexing the encoded video stream and the encoded audio stream in each predetermined period so that the data rate of the multiplexed encoded video stream is almost constant in any predetermined period and that the data rate of the multiplexed encoded audio stream is almost constant in any predetermined period, and generating the transport stream with the multiplexed stream of the encoded video stream and the encoded audio stream.

The seventh aspect of the present invention is a transport stream generating method for generating a transport stream with source video data and source audio data, comprising the steps of encoding the source video data and the source audio data corresponding to an assigned video encoding rate and an assigned audio encoding rate, respectively, and multiplexing the encoded video stream and the encoded audio stream and generating the transport stream so that the data rate of the transport stream is almost constant in any predetermined period.

The eighth aspect of the present invention is a transport stream generating method for generating a transport stream for transmitting source video data and source audio data, comprising the steps of generating a schedule for multiplexing an encoded video stream and an encoded audio stream corresponding to an assigned video encoding rate and an assigned audio encoding rate, encoding the source video data and the source audio data corresponding to the assigned video encoding rate and the assigned audio encoding rate, respectively, and multiplexing the encoded video stream and the encoded audio stream so as to perform a multiplexing process corresponding to the multiplexing schedule in any predetermined period and thereby generate the transport stream.

The ninth aspect of the present invention is a transport stream generating method for encoding source video data and source audio data and outputting the encoded ideo stream and the encoded audio stream as a transport stream, comprising the steps of deciding the data amount of the encoded video stream to be multiplexed in one video frame period and the data amount of the encoded audio stream to be multiplexed in one video frame period corresponding to an assigned target video encoding rate and an assigned target audio encoding rate, respectively, deciding a multiplexing schedule for multiplexing the encoded video stream and the encoded audio stream corresponding to the data amount of the encoded video stream to be multiplexed and the data amount of the encoded audio stream to be multiplexed, and multiplexing the encoded video stream and the encoded audio stream in any video frame period corresponding to the multiplexing schedule so as to output the transport stream.

The tenth aspect of the present invention is a program transmitting apparatus for transmitting a plurality of programs, comprising a plurality of encoding units for encoding a video stream and an audio stream contained in each of the programs, multiplexing the encoded video stream and the encoded audio stream, and outputting the multiplexed stream as a transport stream, a multiplexing unit for multiplexing a plurality of transport streams that are output from the plurality of encoding units, and a controller for controlling the plurality of encoding units and the multiplexing unit, wherein each of the plurality of encoding units generates a basic schedule for multiplexing an encoded video stream and an encoded audio stream in one video period corresponding to a video encoding rate and an audio encoding rate assigned by the controller and multiplexes the encoded video stream and the encoded audio stream in each frame period so as to generate the transport stream without need to perform a simulation for an encoder buffer.

The eleventh aspect of the present invention is a program transmitting apparatus for transmitting a plurality of programs, comprising a plurality of encoding units for encoding a video stream and an audio stream contained in each of the programs, multiplexing the encoded video stream and the encoded audio stream, and outputting the multiplexed stream as a transport stream, a multiplexing unit for multiplexing a plurality of transport streams that are output from the plurality of encoding units, and a controller for controlling the plurality of encoding units and the multiplexing unit, wherein each of the plurality of encoding units decides the data amount of an encoded video stream and the data amount of an encoded audio stream to be multiplexed in a predetermined multiplexing process period corresponding to an assigned video encoding rate and an assigned audio encoding rate, decides a multiplexing schedule for multiplexing the encoded video stream and the encoded audio stream corresponding to the data amount of the encoded video stream to be multiplexed and the data amount of the encoded audio stream to be multiplexed, and multiplexes the encoded video stream and the encoded audio stream corresponding to the multiplexing schedule in each predetermined multiplexing process period.

BRIEF DESCRIPTION OF DRAWINGS

FIG. 10 is a flow chart for explaining a transport generating process;

FIGS. 11A and 11B are flow charts for explaining the transport stream generating process in detail;

FIG. 14 is a flow chart for explaining a conventional transport stream generating process.

BEST MODES FOR CARRYING OUT THE INVENTION

Figure 1:
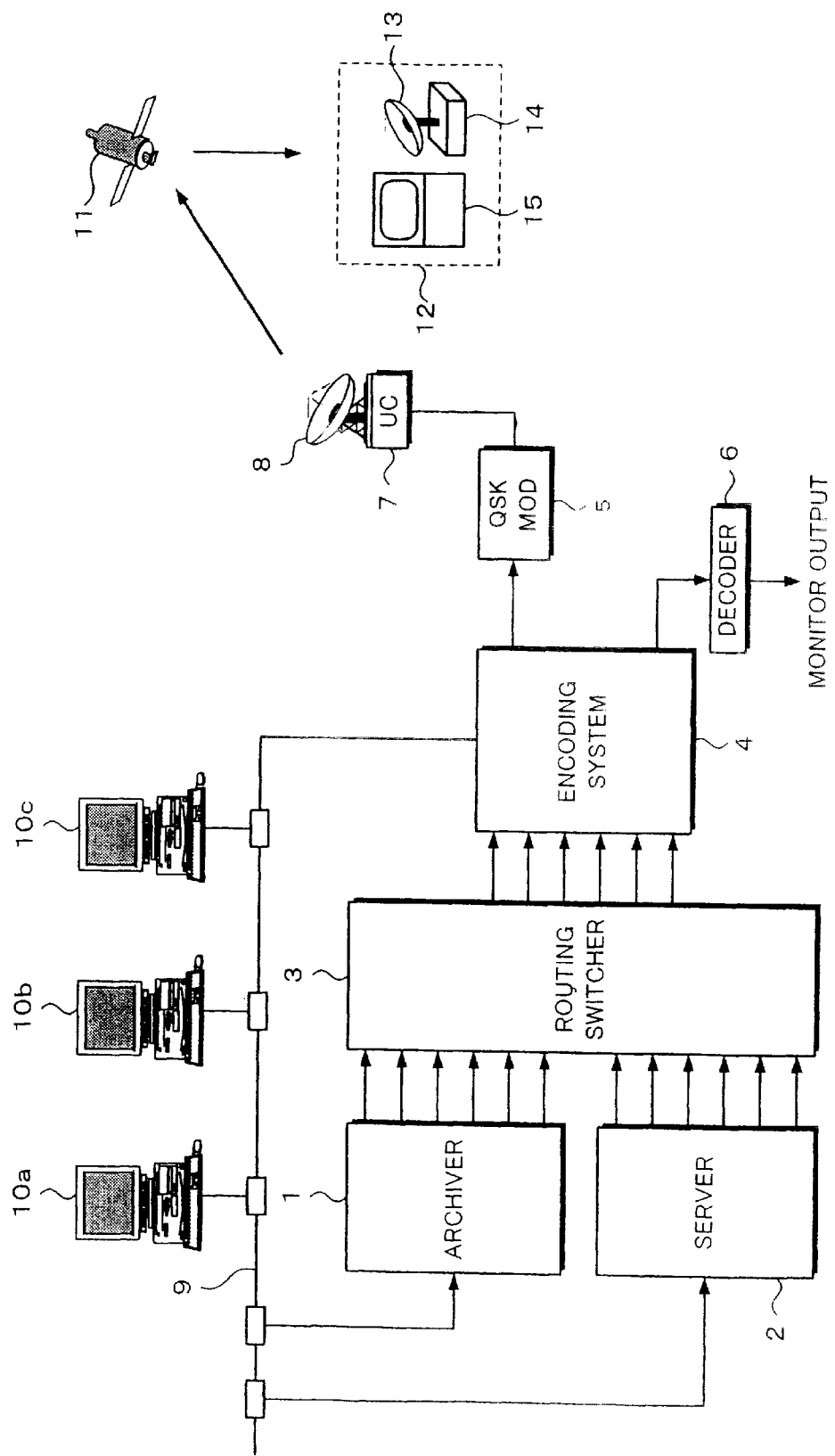
FIG. 1 is a block diagram showing a transmitting system of a digital satellite broadcasting system according to the present invention.

FIG. 1 is a schematic diagram showing an outlined structure of a digital satellite broadcasting system according to the present invention. A transmitting system of the digital broadcasting system has video/audio (AV) information storing units such as an archiver 1 and a server 2. An example of the archiver 1 is a VTR cart machine. An example of the server 2 is an AV server such as a hard disk. AV information is supplied from the archiver 1 and the server 2 to a routing switcher 3. The routing switcher 3 switches AV information. Output information of the routing switcher 3 is supplied to an encoding system 4.

The encoding system 4 comprises a video encoder, an audio encoder, a data multiplexing portion, a stream multiplexing portion, and a transmission path encoding portion. The video encoder and the audio encoder compress video information and audio information corresponding to MPEG2 standard, respectively. The data multiplexing portion multiplexes encoded information and system control header information. The stream multiplexing portion multiplexes streams of a plurality of channels. The transmission path encoding portion performs a scrambling process and error-correction-code encoding process for a multiplexed transport stream received from the stream multiplexing portion. A stream that is output from the encoding system 4 is supplied to a modulating portion, for example, a QSK (Quadrature phase Shift Keying) modulating portion 5. In addition, a decoder 6 that is the same as that of a receiving system is disposed. The decoder 6 outputs monitor data.

An output signal of the QSK modulating portion 5 is supplied to a transmitting antenna 8 through an up-converter 7. The modulated signal is transmitted from the transmitting antenna 8 to a communication satellite 11. In addition to multiplexing video information and audio information, the encoding system 4 multiplexes streams on a plurality of channels. Thus, programs on a plurality of channels can be multiplexed in one frequency band. FIG. 1 shows the case that programs on six channels are multiplexed.

The archiver 1, the server 2, and the encoding system 4 of the transmitting system are connected with a LAN 9 such as Ethernet. The operation of the transmitting system is managed by computers 10a, 10b, and 10c connected with the LAN 9.

A program transmitted from the digital satellite broadcasting system through the communication satellite 11 is received by a receiving system 12 disposed at home. The receiving system 12 has a set-top box 14 and a TV receiver 15 that are connected to a receiving antenna 13.

Corresponding to the transmitting system, the set-top box 14 comprises a QPSK demodulating portion, an error correcting circuit, a descrambling circuit, a video decoder, and an audio decoder.

Figure 2:
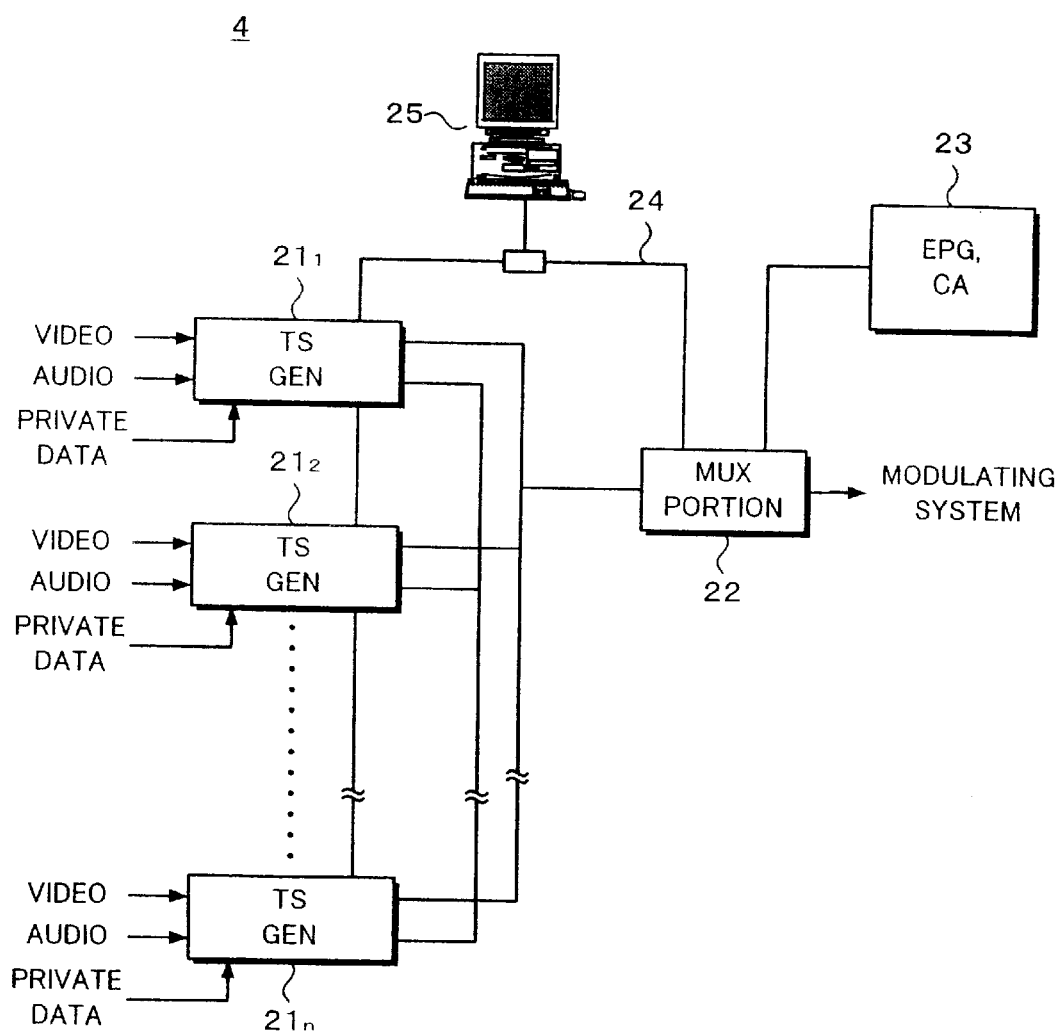
FIG. 2 is a block diagram showing an encoder system of the transmitting system.

FIG. 2 is a block diagram showing the structure of the encoding system 4. In FIG. 2, reference numerals $21_1$, $21_2$, ..., $21_n$, represent transport stream generating apparatuses of n channels. Video data, audio data, and private data (additional data) are supplied to each of the transport stream generating apparatuses. These data are encoded corresponding to MPEG2 standard. When video data is encoded, a target video encoding rate (corresponding to the content of a relevant program) is assigned by a computer 25. Corresponding to the target video encoding rate, the encoding rate can be controlled. Output data of the transport stream generating apparatuses $21_1$, $21_2$, ..., $21_n$ of a plurality of channels is multiplexed by a data multiplexing portion 22. The data multiplexing portion 22 has a transmission path encoding portion that performs a scrambling process and an error-correction-code encoding process. Output data of the data multiplexing portion 22 is supplied to a QSK modulating portion.

Information of each channel is supplied from an EPG (Electronic Program Guide) system and a CA (Conditional Access) system 23 to the data multiplexing portion 22. The encoding system 4 is managed by the computer 25 connected through the LAN 24 such as Ethernet.

Figure 3:
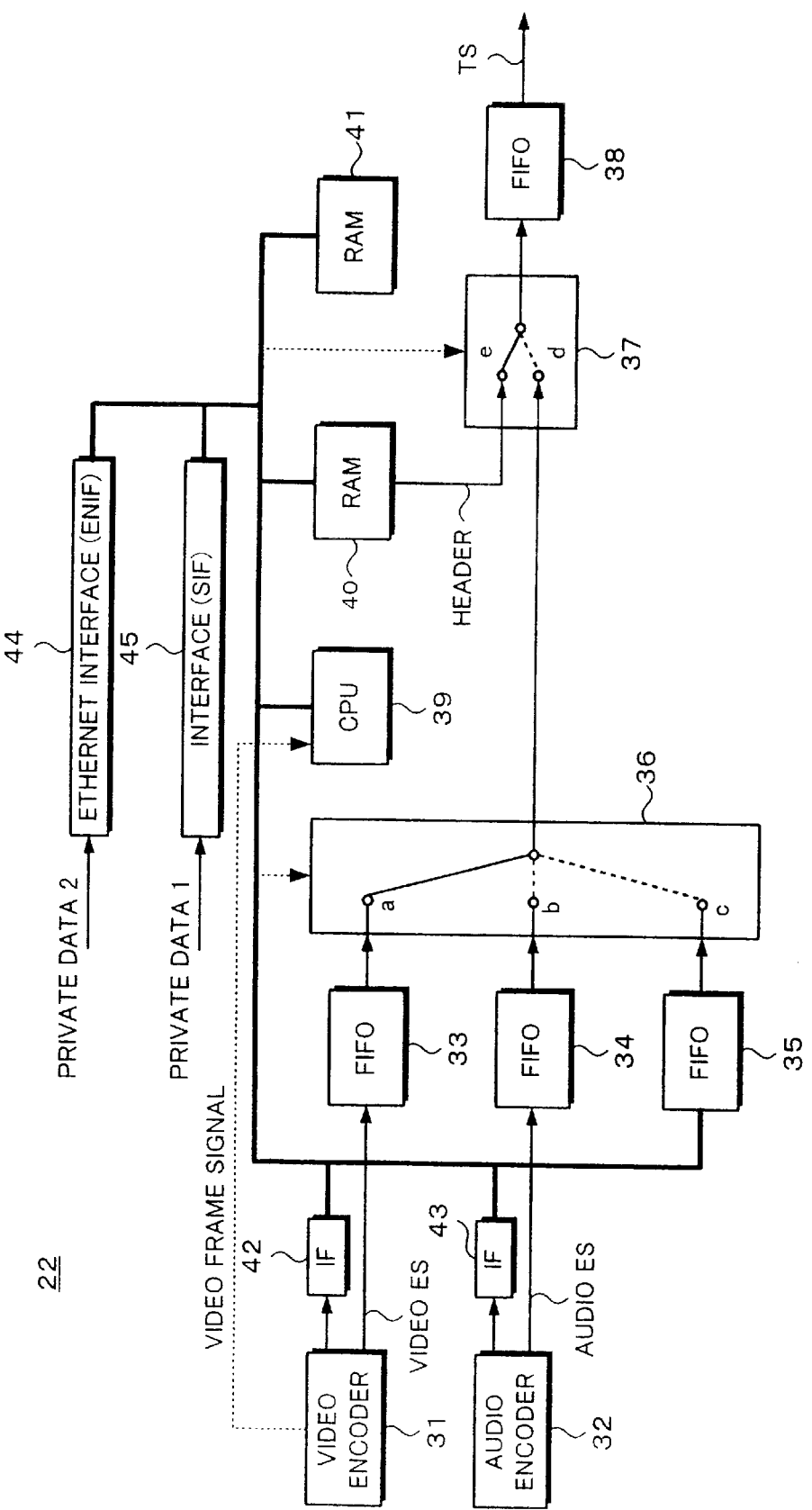
FIG. 3 is a block diagram showing a transport stream generating apparatus according to an embodiment of the present invention.

Each of the transport stream generating apparatuses $21_1$, $21_2$, ..., $21_n$ is structured as shown in FIG. 3. In the following description, for simplicity, it is assumed that data of one channel is multiplexed. In FIG. 3, reference numeral 31 is a video encoder. Reference numeral 32 is an audio encoder. An encoder that encodes subtitle data in association with video data of a movie may be disposed. The data amount of encoded subtitle data is much smaller than the data amount of encoded video data and encoded audio data. Thus, the encoded subtitle data that is transmitted through a CPU bus does not adversely affect the data traffic of the CPU bus.

The video encoder 31 receives video data from an external unit such as a switcher (see FIG. 1) and compression-encodes the video data corresponding to for example MPEG2 standard. A video elementary stream received from the video encoder 31 is supplied to an encoder FIFO (First In First Out) buffer 33 as a buffer memory.

The audio encoder 32 receives audio data from an external unit, compression-encodes the audio data corresponding to for example MPEG2 standard, generates an audio stream with an equal data amount in each audio frame period, and outputs the audio stream to the encoder FIFO buffer 34. In MPEG2 audio layer 2, 1152 samples are encoded and decoded as one audio frame. As a sampling frequency, one of 48 kHz, 44.1 kHz, and 32 kHz can be used. Alternatively, another sampling frequency may be used. Thus, the time periods of one audio frame at these sampling frequencies are 24 ms, 26.1 ms, 36 ms, respectively. The transmission rate of an audio elementary stream of the audio encoder 32 is a fixed rate (for example, 384 k [bits/s].

In addition, a RAM 35 is disposed as a memory for private data. Streams are supplied from the encoder FIFO buffers 33 and 34 and the RAM 35 to input terminals a, b, and c of a multiplexer 36. A stream selected by the multiplexer 36 is supplied to an input terminal d of a multiplexer 37. A stream selected by the multiplexer 37 is output as a transport stream TS through a FIFO buffer 38.

The transport stream generating apparatus shown in FIG. 3 comprises a CPU 39, RAMs 40 and 41, data size counting interfaces 42 and 43, an Ethernet interface 44, and a serial interface 45. The CPU 39 controls the multiplexing process for elementary streams. The RAMs 40 and 41 are connected to the CPU 39 through the CPU bus. Private data 2 and private data 1 are supplied to the CPU bus through the Ethernet interface 44 and the serial interface 45, respectively. Private data is for example, subtitle, additional audio information, text information, and user data.

The multiplexer 36 selects one of the input terminals a, b, and c corresponding to a control signal supplied from the CPU 39 so as to select one of elementary streams that are input to these terminals. The multiplexer 37, to which a multiplexed stream is supplied from the multiplexer 36, is controlled corresponding to a control signal supplied from the CPU 39.

When an elementary stream is not input to any input terminal of the multiplexer 36 or when the multiplexer 36 performs a stuffing process, the multiplexer 36 does not select any of the input terminals a, b, and c. In this case, the multiplexer 36 outputs predetermined blank data (successive "1s" or "0s" as logical values).

The multiplexer 37 selects one of the input terminals d and e corresponding to the control signal, selects an elementary stream from the input terminal d and header data from the input terminal e (a TS packet header or a PES packet header), multiplexes them, and outputs the multiplexed data to the FIFO buffer 38.

The FIFO buffer 38 buffers a data stream multiplexed by the multiplexer 37 and outputs the multiplexed data stream as a transport stream TS to an external unit (not shown) such as a multiplexing portion that multiplexes streams of a plurality of channels.

When necessary, a transport stream that is input from the multiplexer 37 may be output to a storing unit such as a hard disk unit or a magnetic-optical disc unit.

The data size interfaces 42 and 43 count data size per frame or field of a video stream and an audio stream that are input from the video encoder 31 and the audio encoder 32 and supply the counted results to the CPU 39 through the CPU bus. Since the CPU 39 has obtained the data amount of a private stream, a data size interface for the private stream is not required.

The data sizes are counted by counters disposed in the data size interfaces 42 and 43. Alternatively, the data size interfaces 42 and 43 detect the data sizes per frame of elementary streams that are output from the video encoder 31 and the audio encoder 32, respectively.

The Ethernet interface 44 receives the private data 2 that is input through the LAN such as Ethernet (not shown) and outputs the private data 2 to the CPU 39 through the CPU bus. On the other hand, the serial interface 45 receives the private data 1 in a serial format from for example a computer and outputs the private data 1 to the CPU 39 through the CPU bus.

The CPU 39 comprises for example a microprocessor, a ROM, and peripheral circuits. The ROM stores a program. The CPU 39 controls the transport stream generating apparatus so that it performs a desired operation. In reality, the CPU 39 supplies a target video encoding rate to for example a bit rate controlling circuit of the video encoder 31.

In addition, the CPU 39 generates the contents of packet headers of an adaptation field including PCR (Program Clock Reference) information and PES (Packetized Elementary Stream) corresponding to control data stored in the control data RAM 40. The generated headers are stored in the processing RAM 41 and then output through the input terminal e and the output terminal of the multiplexer 37. The multiplexer 36 multiplexes elementary streams. The multiplexer 37 adds the PES packet header and the TS packet header to the multiplexed elementary stream. Thus, the transport stream generating apparatus shown in FIG. 3 converts an elementary stream into a PES packet and a TS packet.

Moreover, the CPU 39 decides the order of elementary streams to be multiplexed and the data amount of each multiplexed elementary stream corresponding to data sizes that is input from the data size interfaces 42 and 43, the Ethernet interface 44, and the serial interface 45 and corresponding to the remaining record capacities (remaining buffer amounts) of the encoder FIFO buffers 33 and 34. Corresponding to the decided results, the CPU 39 controls the multiplexers 36 and 37 and adjusts the multiplexing timings thereof.

The processing RAM 40 stores data amounts necessary for the processes performed by the CPU 39. In reality, a header generated by the CPU 39 is stored in the RAM 40. The header is output from the RAM 40 to the input terminal e of the multiplexer 37. Thus, the header is placed in a transport stream.

The encoding data amounts read from the data size interfaces 42 and 43 by the CPU 39 and the private data that is input through the Ethernet interface 44 or the serial interface 45 are temporarily stored in the processing RAM 40 and used for processes performed by the CPU 39.

In addition, a remaining multiplexed data amount (frame_bit_remain) and so forth are stored in the processing RAM 40. The remaining multiplexed data amount (frame_bit_remain) is used for a process performed by the CPU 39 so as to decide a multiplexed data amount (this process will be described later).

The control data RAM 41 stores control data for a process performed by the CPU 39. The control data RAM 41 stores for example control data (for generating header data), schedule data, and so forth.

Figure 4:
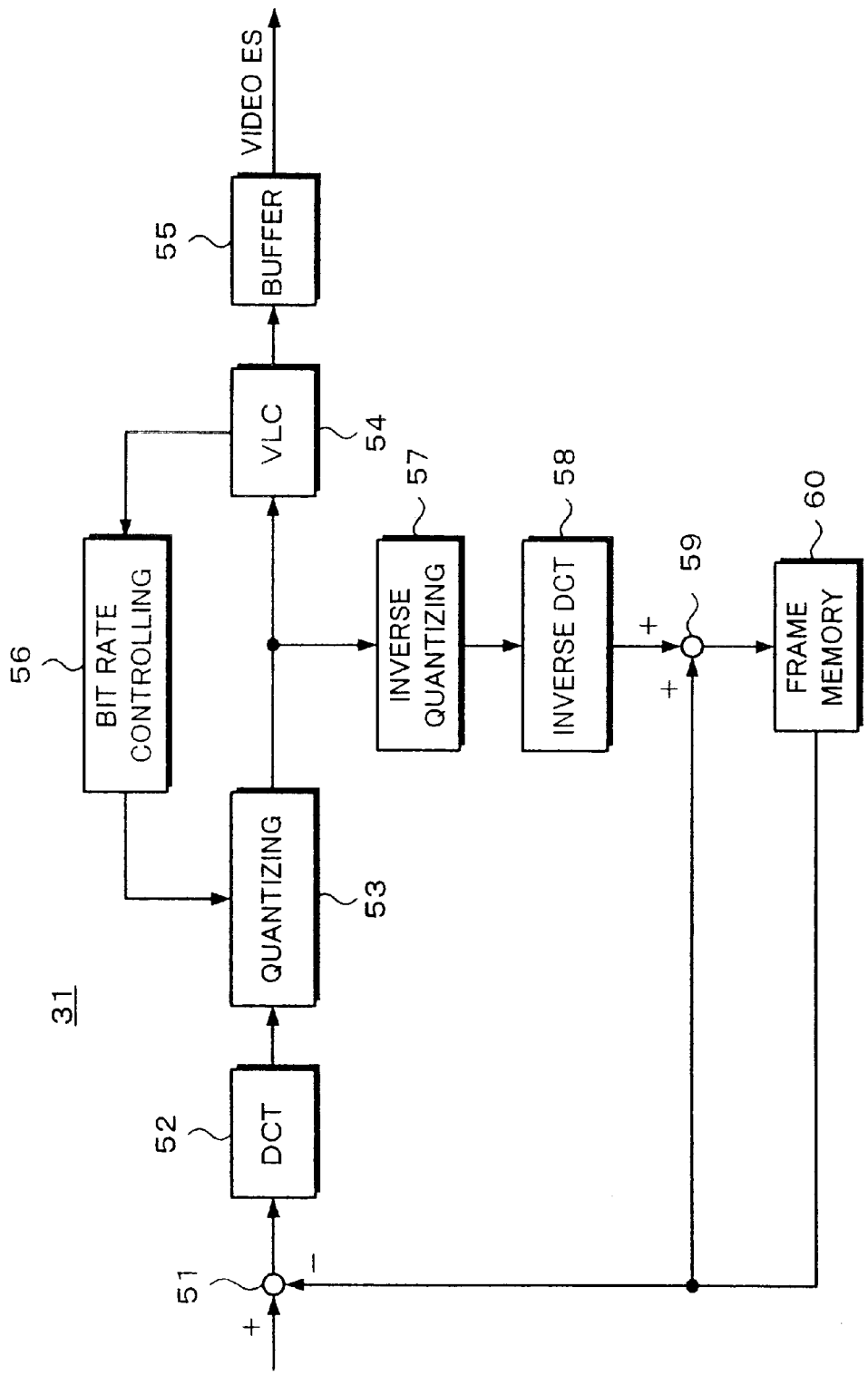
FIG. 4 is a block diagram showing an example of a video encoder.

FIG. 4 shows the structure of the video encoder 31. The video encoder 31 comprises a subtracting circuit 51, a DCT circuit 52, a quantizing circuit 53, a variable length code encoding circuit 54, and a buffer memory 55. The subtracting circuit 51 calculates the difference between input video data and locally decoded video data. The DCT circuit 52 performs a DCT process for output data of the subtracting circuit 51. The quantizing circuit 53 quantizes coefficient data supplied from the DCT circuit 52. The variable length code encoding circuit 54 performs a variable length code (VLC) encoding process for output data of the quantizing circuit 53. The buffer memory 55 obtains output data of the variable length code encoding circuit 54 as output data at a constant rate. Information of generated data amount of the variable length code encoding circuit 54 is supplied to the bit rate controlling circuit 56. The bit rate controlling circuit 56 controls a quantizing scale. Thus, the generated data amount is controlled. The video encoder 31 also has a locally decoding portion. The locally decoding portion has an inverse quantizing circuit 57, an inverse DCT circuit 58, an adding circuit 59, and a frame memory 60.

In addition, the video encoder 31 has a motion detecting portion (not shown). The motion detecting portion detects a moving vector for each macro block. Corresponding to the detected moving vector, the frame memory 60 is controlled so as to compensate the motion.

In MPEG standard, three picture types have been defined. They are an I (Intra) picture that is an intra-frame encoded picture, a P (Predictive) picture that is an inter-frame forward predictive encoded picture, and a B (Bidirectionally predictive) picture that is a bidirectionally predictive picture. As with the picture types, four macro block types have been defined. They are an intra-frame encoded macro block, a forward inter-frame predictive macro block (a future picture is predicted with a past picture), a backward inter-frame predictive macro block (of which a past picture is predicted with a future picture), and an interpolative macro block (of which a picture is predicted in both forward and backward directions).

All macro blocks in the I picture are intra-frame encoded macro blocks. The P picture contains intra-frame encoded macro blocks and forward inter-frame predictive macro blocks. The B picture contains all the four types of macro blocks. Locally decoded data is formed corresponding to the types of macro blocks. When the predictive encoding process is performed, the subtracting circuit 51 calculates the difference between the input video data and the locally decoded video data. When the intra-frame encoding process is performed, the subtracting circuit 51 does not calculate the difference between the input video data and the locally decoded video data and directly outputs the input video data.

The CPU 39 of the transport stream generating apparatus supplies a target data amount (video_rate_target) to the bit rate controlling circuit 56 of the video encoder 31. The bit rate controlling circuit 56 controls the quanitzing circuit 53 corresponding to the data amount of the video elementary stream generated by the variable length code encoding circuit 54 so that the data amount of data that has been compression-encoded is equal to the assigned target data amount (video_rate_target).

Figure 5:
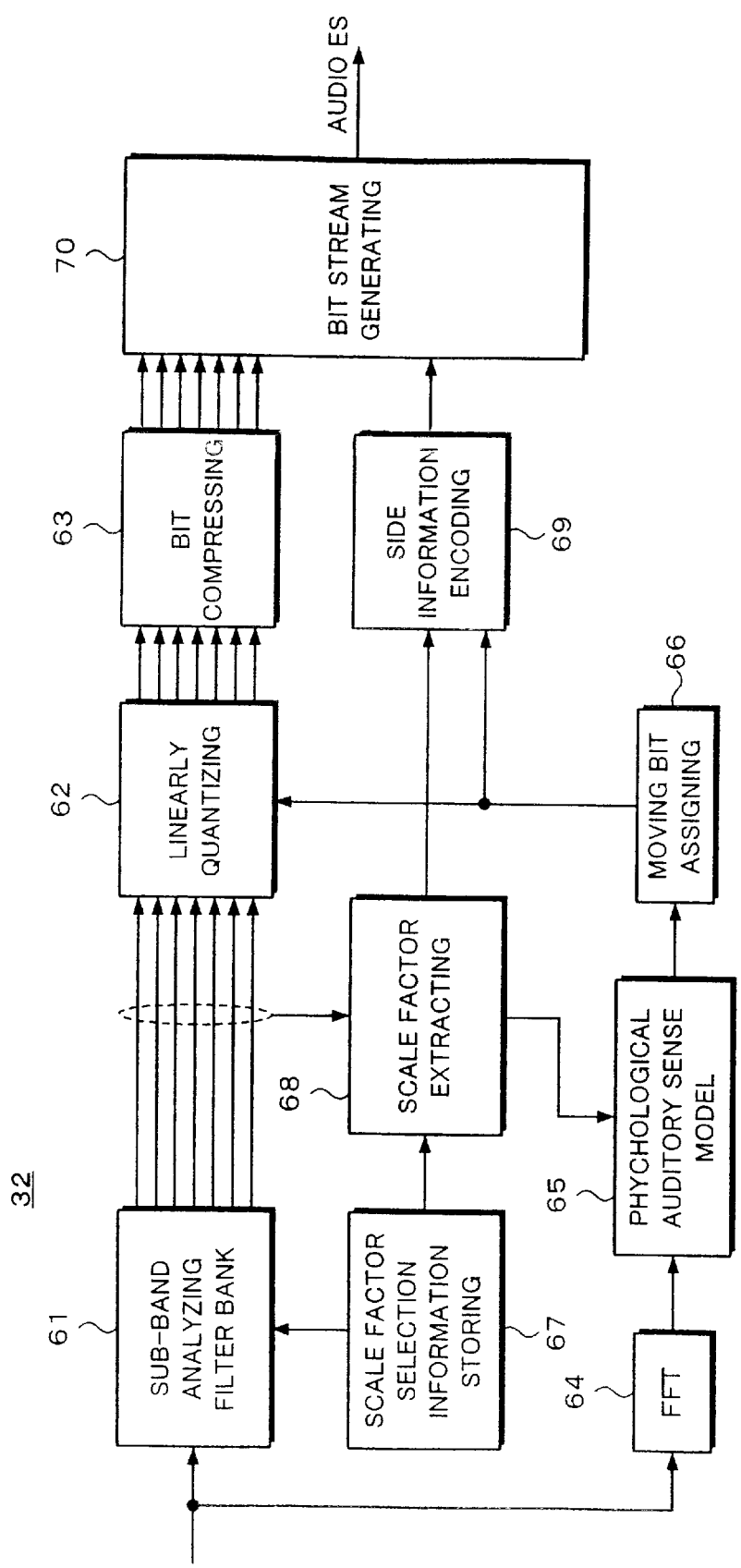
FIG. 5 is a block diagram showing an example of an audio encoder.

As shown in FIG. 5, the audio encoder 32 comprises a sub-band analyzing filter bank (SAFB) 61, a linearly quantizing circuit 62, a bit compressing circuit 63, an FFT (First Fourier Transfer) circuit 64, a psychological auditory sense model 65, a moving bit assigning circuit 66, a scale factor selection information storing circuit 67, a scale factor extracting circuit 68, a side information encoding circuit 69, and a bit stream generating circuit 70.

The audio decoder 32 receives audio data from an external unit, compression-encodes the audio data corresponding to MPEG2 standard, generates an audio stream, and outputs the audio stream to the encoder FIFO buffer 34 and the data size interface 43.

According to the embodiment of the present invention, the transport stream generating apparatus multiples a video elementary stream, an audio elementary stream, and a private elementary stream and generates a transport stream corresponding to MPEG2 standard. Next, the multiplexing process will be described.

First, streams will be described. In this example, a stream converting process for generating a transport stream with an encoded video stream will be described. Only a stream converting method for converting an encoded video stream into a transport stream will be exemplified. Since the converting process for a video stream is the same as the converting process for an audio stream, the description of the latter will be omitted.

Figure 6:
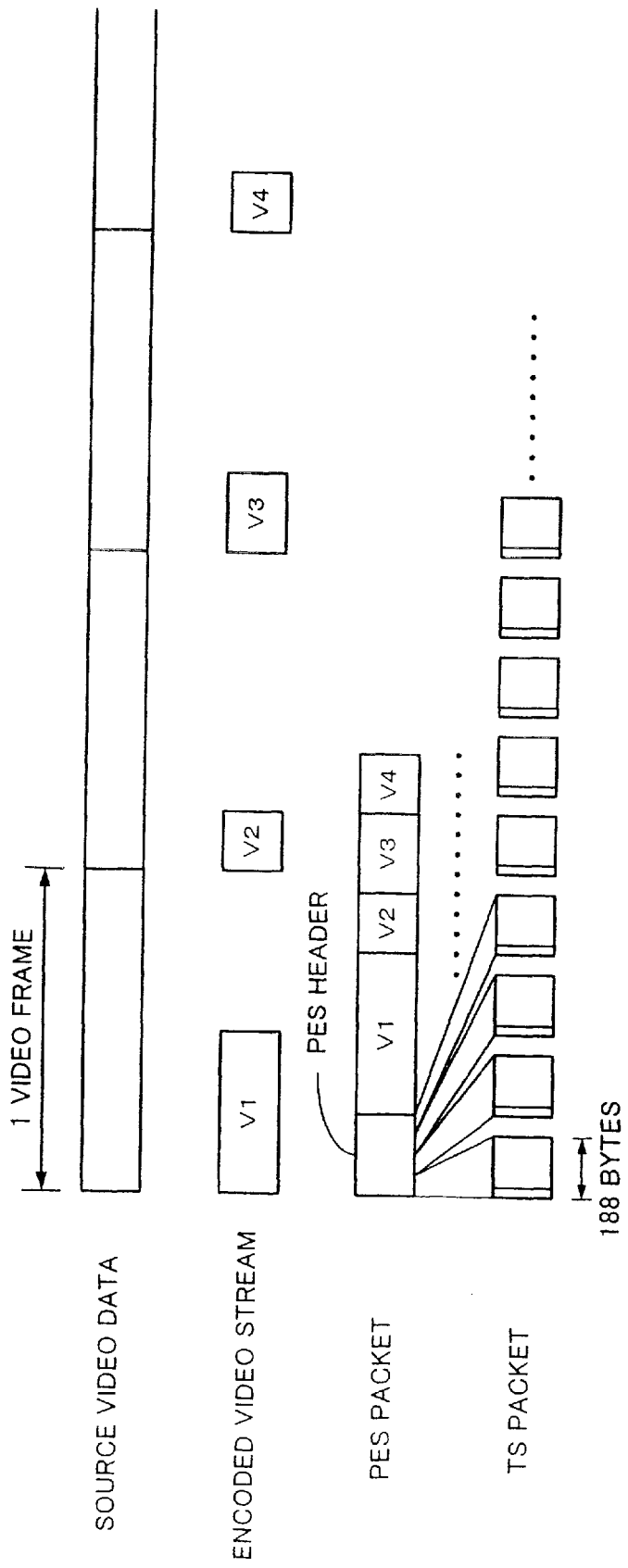
FIG. 6 is a schematic diagram showing a generation of streams.

As shown in FIG. 6, when source video data is encoded corresponding to MPEG2 standard, several video frames are defined as one GOP (Group Of Picture). Source video data is compression-encoded for each GOP. At this point, at least one picture of GOP is an I picture and remaining pictures of GOP are P or B pictures. The I picture is a picture that has been compression-encoded by the intra-frame encoding process. The P picture is a picture that has been compression-encoded by the inter-frame predictive encoding process with an I picture or another P picture. The B picture is a picture that has been compression-encoded by the bidirectional inter-frame predictive encoding process with backward and forward pictures.

As shown in FIG. 6, the data amount of an encoded video stream corresponding to MPEG2 standard varies depending on the picture type of each video frame (I picture, B picture, or P picture) or depending on whether or not moving compensation is present. Thus, the data amount of an encoded video stream that is output from the video encoder in one video frame period is not always constant.

The encoded video stream is referred to as elementary stream (ES). As shown in FIG. 6, by adding a header to encoded video streams V1, V2, V3, and V4, a PES (Packetized Elementary Stream) packet is formed.

The PES packet data is divided every 184 bytes. By adding a transport packet header (TS header) of four bytes to the beginning of each divided portion, a transmission transport packet is formed.

Figure 7:
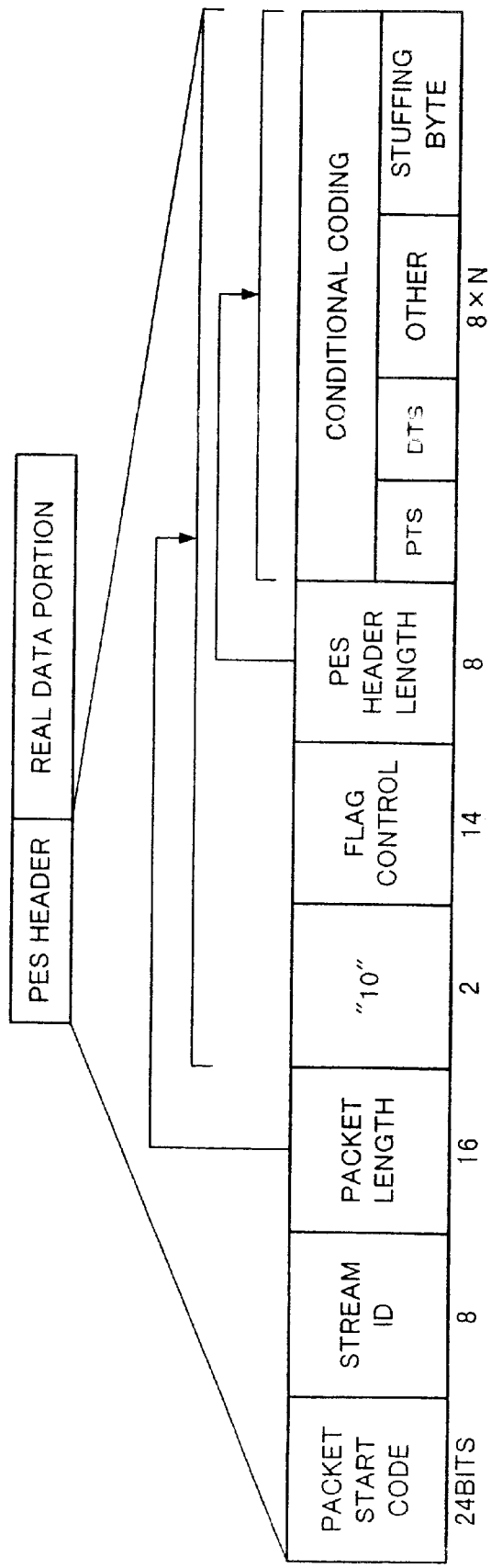
FIG. 7 is a schematic diagram showing the structure of a PES header.

As shown in FIG. 7, a PES packet is composed of a packet start code (24 bits), a stream ID (8 bits), a packet length (16 bits), code data, a flag controlling portion, a PES header length, and a variable length conditional coding portion. The packet start code represents the beginning of the PES packet. The stream ID represents the type of stream data placed in the real data portion of the PES packet (for example, the type of video or audio). The packet length represents the length of data that follows. The coding data represents a value "10". The PES header length represents the length of data of the conditional coding portion. The variable length conditional coding portion has reproduction output time information (PTS:Presentation Time Stamp), decoding time management information (DTS:Decoding Time Stamp), and stuffing byte for adjusting the data amount.

Figure 8:
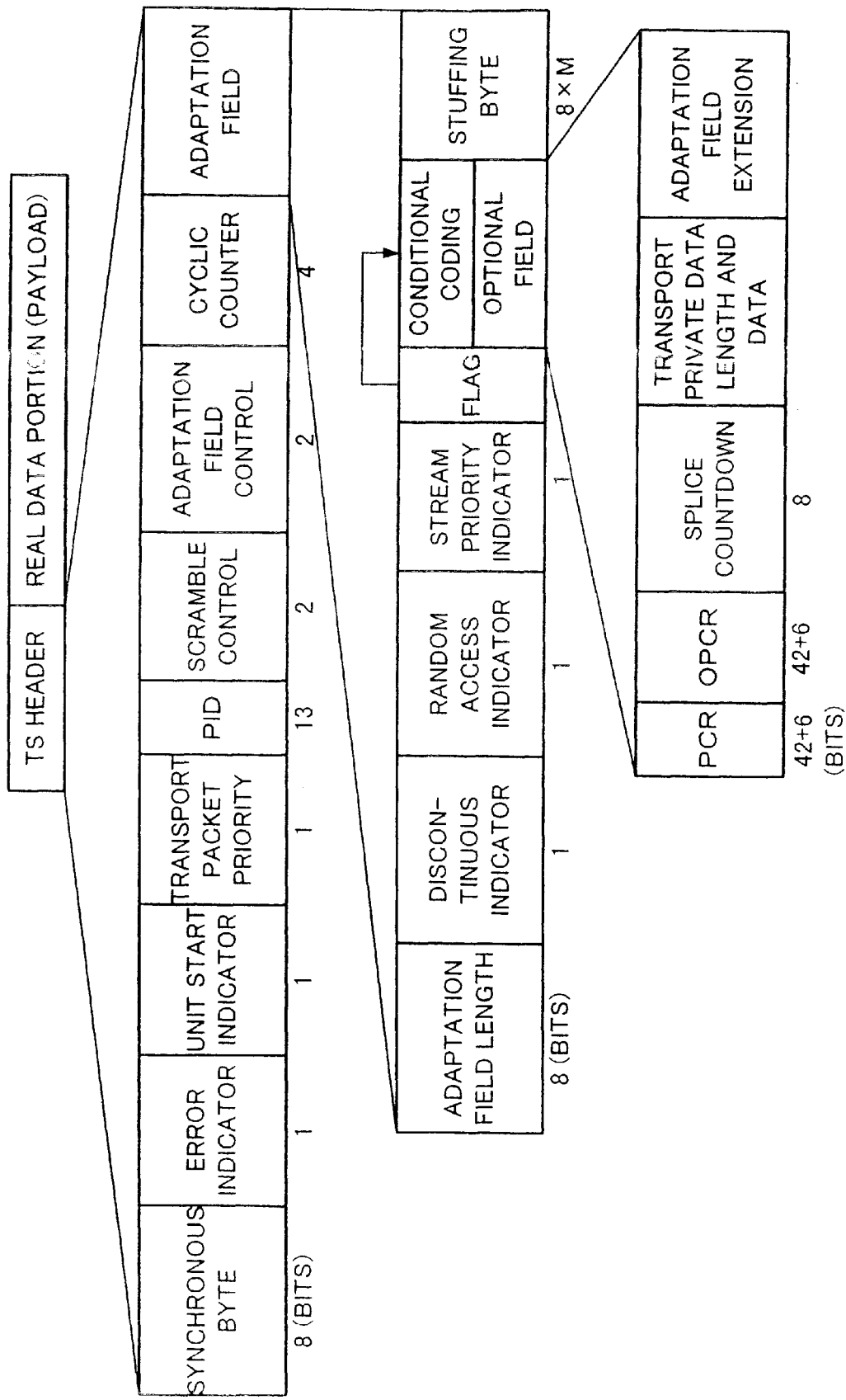
FIG. 8 is a schematic diagram showing the structure of a TS header.

As shown in FIG. 8, a TS packet is composed of a TS header portion (4 bytes) and a payload portion (184 bytes). In the payload portion, real data is recorded. The TS header portion is composed of a synchronous byte (8 bits), an error indicator, a unit start indicator, a transport packet priority portion, a PID portion, a scramble controlling portion, an adaptation field controlling portion, a cyclic counter portion, and an adaptation field portion. The synchronous byte represents the beginning of the TS packet. The error indicator represents whether or not a bit error is present in the packet. The unit start indicator represents whether or not the beginning of the PES packet is present in the TS packet. The transport packet priority portion represents the importance of the TS packet. The PID portion has packet identification information PID that represents the type of the stream data placed in the payload portion of the TS packet. The scramble controlling portion represents whether or not the stream data placed in the payload has been scrambled. The adaptation field controlling portion represents whether or not the adaptation field portion and the payload portion are present in the TS packet. The cyclic counter portion has cyclic counter information that represents whether or not the TS packet with the same packet identification information has been discarded in the middle of the TS packet. The adaptation field portion has various control information.

The adaptation field portion is composed of an adaptation field length, a discontinuous indicator, a random access indicator, a stream priority indicator, a flag controlling portion, a conditional coding portion, and a stuffing byte portion. The adaptation field length represents the length of the adaptation field portion. The discontinuous indicator represents whether or not time information has been reset in a TS packet of the current stream that follows the current TS packet. The random access indicator represents whether or not the TS packet is an entry point of the random access operation. The stream priority indicator represents whether or not an important portion of the stream data is placed in the payload portion of the TS packet. The flag controlling portion has flag information of the conditional coding portion. The conditional coding portion has reference time information (PCR: Program Clock Reference), reference time information (OPCR: Original Program Clock Reference), a slice countdown (that represents an index to a data change point), and so forth. The stuffing byte portion is used to adjust the data amount.

Next, with reference to FIG. 9, the structure of a transport stream used in the transport stream generating apparatus according to the present invention will be described.

Figure 9:
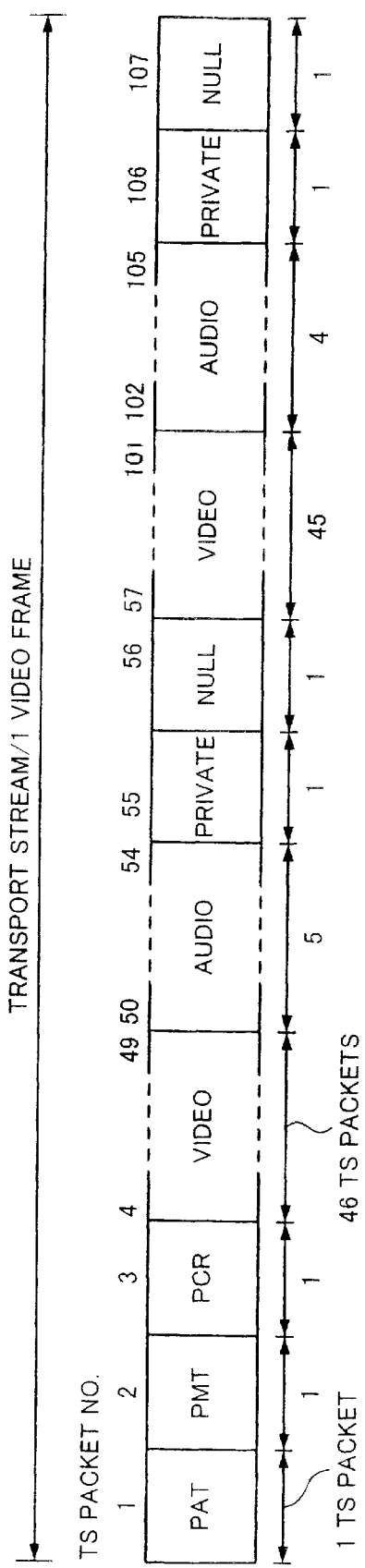
FIG. 9 is a schematic diagram showing the structure of a transport stream.

FIG. 9 shows the structure of a transport stream of which an encoded video stream, an encoded audio stream, and other data are multiplexed corresponding to a multiplexing schedule as a feature of the present invention. The transport stream is composed of a plurality of transport packets that transmit PAT (Program Association Table) data, PMT (Program Map Table) data, PCR (Program Clock Reference) data, an encoded video stream, an encoded audio stream, private data, and null data, and so forth.

Next, various types of data transmitted as a transport stream will be described.

The PMT (Program Map Table) is information that represents packet identification information PID of the TS packet that contains a video stream and an audio stream of a program. For example, a video stream with a program number "X" is transmitted with a TS packet with packet identification information PID "XV". An audio stream is transmitted with a TS packet with packet identification information PID "XA". Thus, corresponding to the packet identification information PID "XV" and "XA" of the PMT, a transport packet that transmits a video stream and an audio stream with the program number "X" can be identified.

The PMT is composed of a table ID (8 bits), a section syntax indicator (1 bit), "0" reserved data (2 bits), a section length (12 bits), a program number (16 bits), a reserved portion (2 bits), a version number (5 bits), a current next indicator (1 bit), a section number (8 bits), a last section number (8 bits), a reserved portion (3 bits), a PCR (Program Clock Reference) PID (13 bits), a reserved portion (4 bits), a program info length (12 bits), a descriptor (several bits), a stream type (8 bits), a reserved portion (3 bits), an elementary PID (13 bits), a reserved portion (4 bits), an ES info length (12 bits), a descriptor (several bits), and a CRC (32 bits). Thus, even if user data of several ten bytes is written to the descriptor, the data size of the PMT is at most 25 bytes.

The PAT (Program Association Table) is information that represents packet identification information PID of the TS packet that has the PMT generated for each program.

The PAT is composed of a table ID (identifier) (8 bits) (that represents the type of a table defined in MPEG2 standard), a section syntax indicator (1 bit), "0" data (1 bit), a reserved portion (2 bits), a section length (12 bits), a transport stream (TS) ID (16 bits), a reserved portion (2 bits), a version number (5 bits), a current next indicator (1 bit), a section number (8 bits), a last section number (8 bits), a program number (16 bits), a reserved portion (3 bits), a network PID (13 bits) or a program map (PID) (13 bits), and a CRC (Cyclic Redundancy Check) (32 bits). Thus, the data size of the PAT is around 16 bytes.

The PCR (Program Clock Reference) is information with which the value of the STC (System Time Clock) is set as a reference time at a desired timing by the encoder. The PCR is composed of six bytes including real data of 42 bits.

The private data is any user data that has not been defined in MPEG2 standard. EPG (Electric Program Guide) data and subtitle data are transmitted as the private data. The private data is composed of several bytes to several ten bytes as with each of the PAT, PMT, and PCR.

The null data is dummy data placed in a transport stream so that the transmission rate of the transport stream transmitted in one video frame period is always constant. The null data is composed of several bytes to several ten bytes as with the private data.

The transport stream shown in FIG. 9 is generated corresponding to a multiplexing schedule in the case that the target video encoding rate (target_video_rate [bits/s]) supplied from the computer 25 to the video encoder 31 is 4 M [bits/s] and the target audio encoding rate (target_audiop_rate [bits/s]) supplied from the computer 25 to the audio encoder 2 is 384 K [bits/s].

Next, with reference to FIG. 9, a method for generating multiplexing schedule data that is a feature of the present invention will be described.

In the transport stream generating apparatus according to the present invention, before PCR, PAT, PMT, an encoded video stream, an encoded audio stream, and private data are multiplexed, schedule data for scheduling the multiplexing process for these data in one video frame period is generated. The schedule data is data that defines the number of transport packets necessary for transmitting various data in one video frame period and also defines transport packets corresponding to various data.

Next, a practical method for generating multiplexing schedule data will be described. To generate multiplexing schedule data, the number of transport packets transmitted in one video frame period should be obtained. Next, a method for obtaining the number of transport packets will be described.

As described above, since the PAT data, PMT data, and PCR data are composed of several bytes to several ten bytes each, the data amount of each of these data does not exceed 184 bytes that is a data unit of one transport packet. Thus, in the transport generating apparatus according to the present invention, each of the PAT data, PMT data, and PCR data is transmitted with one transport packet.

In addition, the private data and null data are composed of several bytes to several ten bytes each as with the PAT data, PMT data, and PCR data. Thus, the data amount of each of the private data and null data does not exceed 184 bytes that is a data unit of one transport packet. Thus, the private data and null data can be transmitted with one transport packet each. However, in the transport stream generating apparatus according to the present invention, each of the private data and null data is transmitted with two transport packets each so that the user can transmit much private data.

Next, the number of transport packets necessary for transmitting an encoded video stream is obtained.

In this case, it is assumed that the target video encoding rate (target_video_rate [bits/s]) supplied from the computer 25 to the video encoder 31 is 4 M [bits/s].

Since the frame frequency (frame_frequency [Hz]) of a video stream corresponding to NTSC format is 1/29.97 [Hz], when the target video encoding rate (target_video_rate [bits/s]) supplied from the computer 25 is 4 M [bits/s], the data amount (size_frame_video [bytes]) of an encoded video stream that is output from the video encoder 31 in one video frame period is expressed as follows.

size_frame_video (bytes)
=target_video_rate [bits/s] ×
frame_frequency [Hz] / 8 [bits]
=4000000/29.97/8
=16683.35 [bytes].

In other words, the video encoder 31 outputs an encoded video stream of 16683.35 bytes in one video frame period.

The output stream is supplied to the encoder FIFO buffer 33. However, the FIFO buffer 33 that buffers the encoded stream outputs the encoded video stream for one byte at a time, data of 0.35 byte per video frame remains in the encoder FIFO buffer 33. In other words, a stream of 16683.35 bytes is supplied to the encoder FIFO buffer 33 in one video frame period. The encoder FIFO buffer 33 outputs data of 16683 bytes. Thus, data of 0.35 byte remains per video frame in the encoder FIFO buffer 33. Consequently, the encoder FIFO buffer 33 overflows.

To prevent the encoder FIFO buffer 33 from overflowing, the transport stream generating apparatus according to the present invention decides whether the data amount of encoded video data that is output from the encoder FIFO buffer 33 is 16683 bytes or 16684 bytes corresponding to data that remains in the encoder FIFO buffer 33 for each video frame.

Next, the number of transport packets necessary for transmitting an encoded video stream of 16683 bytes is obtained. Since the data amount of one transport packet is 184 bytes, the data amount (size_frame_video [bytes]) of an encoded video stream of 16683 bytes that is output from the video encoder 31 in one video period is expressed as follows.

size_frame_video [bytes]
=16683 [bytes]
=184 [bytes]×90 [packets]+123 [bytes]

In other words, to transmit an encoded video stream of 16683 bytes that is output in one video frame period, 90 transport packets are required.

Likewise, the number of transport packets necessary for transporting an encoded video stream of 16684 bytes is obtained. The data amount of the encoded video stream of 16684 bytes that is output from the video encoder 31 in one video frame period is expressed as follows.

size_frame_video [bytes]
=16684 [bytes]
=184 [bytes]×90 [packets]+124 [bytes]

Thus, as with the case that an encoded video stream of 16683 bytes is transmitted, to transmit an encoded video stream of 16684 bytes that is output in one video frame period, 90 transport packets are required.

In other words, regardless of whether an encoded video stream that is output from the encoder FIFO buffer 33 in the output stage of the video encoder 24 in one video frame period is composed of 16683 bytes or 16684 bytes, the encoded video stream is transmitted with 90 transport packets.

Next, the number of transport packets necessary for transmitting an encoded audio stream is obtained.

In this case, it is assumed that the target audio encoding rate (target_audio_rate [bits/s]) supplied from the computer 25 to the audio encoder 32 is 384 k [bits/s].

Since the frame frequency (frame_frequency [Hz]) of a video stream in NTSC format is 1/29.97 [Hz], when the target audio encoding rate (target_audio_rate [bits/s]) is 384 k [bits/s], the data amount (size_frame_audio (bytes]) of an encoded audio stream that is output from the audio encoder 32 in one video frame period is expressed as follows.

size_frame_audio [bytes]
=target_audio_rate [bits/s]×
frame_frequency [Hz]/8 [bits]
=384000/29.97/8
=1601.6016 [bytes]

In other words, an encoded audio stream of 1601.6016 bytes is output per video frame from the audio encoder 32 and buffered in the encoder FIFO buffer 34. However, as with the encoder FIFO buffer 33, the encoder FIFO buffer 3 outputs an encoded audio stream for one byte at a time. Thus, data of 0.6016 byte remains in the encoder FIFO buffer 34 per video frame. In other words, data of 0.6016 bytes remains in the encoder FIFO buffer 34 per video frame. Thus, the encoder FIFO buffer 34 overflows.

To prevent the encoder FIFO buffer 34 from overflowing, the transport stream generating apparatus according to the present invention decides whether the data amount of encoded audio data that is output from the encoder FIFO buffer 34 is 1601 bytes or 1602 bytes corresponding to data that remains in the encoder FIFO buffer 34 for each audio frame.

Next, the number of transport packets necessary for transmitting an encoded audio stream of 1601 bytes is obtained. Since the size of data transmitted with one transport packet is 184 bytes, the encoded audio stream of 1601 bytes is expressed as follows.

size_frame_audio [bytes]
=1601 [bytes]
=184 [bytes]×8 [packets]+129 [bytes]

Thus, the encoded audio stream of 1601 bytes can be transmitted with eight transport packets.

Likewise, the number of transport packets necessary for transmitting an encoded audio stream of 1602 bytes is obtained. Since the size of the data transmitted with one transport packet is 184 bytes, an encoded audio stream of 1601 bytes is expressed as follows.

size_frame_audio [bytes]
=1602 [bytes]
=184 [bytes]×8 [packets]+130 [bytes]

Thus, as with the case that the encoded audio stream of 1601 is transmitted, the encoded audio stream of 1602 bytes can be transmitted with eight transport packets.

In other words, regardless of whether the encoded audio stream that is output from the audio encoder 32 is composed of 1601 bytes or 1602 bytes in one video frame period, the encoded audio stream is transmitted with eight transport packets. When an encoded audio stream of 1601 bytes or 1602 bytes that is output in one video frame period is transmitted with eight transport packets, audio data of 129 bytes or 130 bytes remains in the encoder FIFO buffer 34. However, in the transport stream generating apparatus according to the present invention, the remaining audio data of 129 bytes or 130 bytes is transmitted in the next video frame period.

As described above, when the target video encoding rate and the target audio encoding rate supplied from the computer 25 are 4 M [bits/s] and 384 k [bits/s], respectively, the size of transport packets necessary for transmitting the encoded video stream is 90 packets. In this case, the size of transport packets necessary for transmitting the encoded video stream is 8 packets.

However, in DBV standard, when an encoded video stream and an encoded audio stream are converted into a transport stream, since additional information of adaptation fields of a PES header and a TS packet header (19 bytes) is added, the data amount of the video stream and the audio stream converted into the transport stream is larger than the data amount of the encoded video stream and the encoded audio stream that are output from the video encoder 31 and the audio encoder 32.

Because of the increase of the data amount of the additional information, in the case that the target video encoding rate and the target audio encoding rate supplied from the computer 25 are 4 M [bits/s] and 384 k [bits/s], respectively, 91 packets are assigned as the size of transport packets necessary for transmitting an encoded video stream. In this case, 9 packets are assigned as the size of transport packets necessary for transmitting an encoded audio stream.

As described above, corresponding to the target video encoding rate and the target video encoding rate supplied from the computer 25, the number of transport packets necessary for transmitting PCR data, the number of transport packets necessary for transmitting PAT data, the number of transport packets necessary for transmitting PMT data, the number of transport packets necessary for transmitting an encoded video stream, the number of transport packets necessary for transmitting an encoded audio stream, and the number of transport packets necessary for transmitting private data can be decided.

Thus, when the target video encoding rate and the target audio encoding rate supplied from the computer 25 are 4 M [bits/s] and 384 k [bits/s], respectively, the number of transport packets necessary for transmitting an encoded video stream is 91; the number of transport packets necessary for transmitting an encoded audio stream is 9; the number of transport packets necessary for transmitting each of PCR, PAT, and PMT is 1; and the number of transport packets necessary for transmitting each of private data and null data is 2. Thus, the total number of transport packets (total_size_frame_transport) contained in one transport stream transmitted in one video frame period is expressed as follows.

total_size_frame_transport=1+1+1+91+9+2+2=107

In the above example, the target video encoding rate and the target audio encoding rate supplied from the computer 25 is assigned as 4 M [bits/s] and 384 k [bits/s], respectively. However, the present invention is not limited to the assigned target video encoding rate and target audio encoding rate. In other words, the target video encoding rate and the target audio encoding rate can be freely assigned. In this case, the number of transport packets necessary for transmitting an encoded video stream and the number of transport packets necessary for transmitting an encoded audio stream are different from "91 and "9", respectively.

Next, a method for multiplexing PCR data (one transport packet), PAT data (one transport packet), PMT data (one transport packet), an encoded video stream (91 transport packets), an encoded audio stream (9 transport packets), private data (2 transport packets), and null data (2 transport packets) will be described.

The transport stream generating apparatus according to the present invention multiples PAT data, PMT data, PCR data, an encoded video stream, an encoded audio stream, private data, and null data in the order and generates a transport stream.

In reality, as shown in FIG. 9, in 107 transport stream packets, the 1-st transport packet is used as a transport packet for transmitting PAT data. The 2-nd transport packet is used as a transport packet for transmitting PMT data. The 3-rd transport packet is used as a transport packet for transmitting PCR data. The 4-th to 49-th transport packets are used as transport packets for transmitting around a half of data of an encoded video stream. The 50-th to 54-th transport packets are used as transport packets for transmitting around a half of data of an encoded audio stream. The 55-th transport packet is used as a transport packet for transmitting a half of private data. The 56-th transport packet is used as a transport packet for transmitting a half of null data.

Likewise, the 57-th to 101-st transport packets are used as transport packets for transmitting the remaining half of the data of the encoded video data. The 102-nd to 105-th transport packets are used as transport packets for transmitting the remaining half of the data of the encoded audio stream. The 106-th transport packet is used as a transport packet for transmitting the remaining half of the private data. The 107-th transport packet is used as a transport packet for transmitting the remaining half of the null data.

The CPU 39 generates schedule data so as to multiplex PAT data, PMT data, PCR data, an encoded video stream, an encoded audio stream, private data, and null data as shown in FIG. 9. In other words, the schedule data is data for causing the transport stream generating apparatus to perform the following multiplexing control process. In 107 transport stream packets, PAT data, PMT data, and PCR data are transmitted as the 1-st transport packet, the 2-nd transport packet, and the 3-rd transport packet, respectively. Around a half of data of an encoded video stream is transmitted as the 4-th to 49-th transport packets. Around a half of data of an encoded audio stream is transmitted as the 50-th to 54-th transport packets. Around a half of private data is transmitted as the 55-th transport packet. Around a half of null data is transmitted as the 56-th transport packet. The remaining half of the data of the encoded video stream is transmitted as the 57-th to 101-st transport packets. The remaining half of the data of the encoded audio stream is transmitted as the 102-nd to 105-th transport packets. The remaining half of the private data is transmitted as the 106-th transport packet. The remaining half of the null data is transmitted as the 107-th transport packet.

The reason why an encoded video stream and an encoded audio stream are transmitted as two portions each in a transport stream corresponding to one video frame period is in that the decoder video buffer and the decoder audio buffer are suppressed from overflowing.

In FIG. 9, PAT data, PMT data, PCR data, an encoded video stream, an encoded audio stream, private data, and null data are transmitted in the order thereof. However, the transmission order of a transport stream according to the present invention is not limited to that shown in FIG. 9. For example, PCR data may be followed by PAT data. In addition, an encoded audio stream may be followed by an encoded video data. In the above-described example, an encoded video stream and an encoded audio stream are transmitted as two portions each in one transport stream. However, to more securely suppress the decoder video buffer and the decoder audio buffer from overflowing, an encoded video stream and an encoded audio stream may be transmitted as three or four portions each.

Next, with reference to a flow chart shown in FIG. 10, the transport stream generating process of the CPU 39 will be described.

At step S10, the CPU 39 resets a frame variable "n" to "1". The frame variable "n" is a variable that represents a frame number.

At step S11, the CPU 39 receives a target video encoding rate (target_video_rate [bits/s]) and a target audio encoding rate (target_audio_rate [bits/s]) from the computer 25.

The target video encoding rate is data assigned to each encoder that encodes video data of each program. When a video program has a picture that largely moves, the target video encoding rate is assigned a relatively large value. When a video program has a picture that does not largely move, the target video encoding rate is assigned a relatively small value. In other words, the target video encoding rate is data statistically calculated corresponding to the difficulty of video data of each program. Since an audio encoding rate is a fixed rate selected from a plurality of encoding rates that have been standardized, the user cannot assign any rate as an audio encoding rate. Next, at step S12, the CPU 39 generates multiplexing schedule data corresponding to an assigned target video encoding rate and an assigned target audio encoding rate so as to multiplex an encoded video stream and an encoded audio stream. As described above, in the case that the target video encoding rate and the target audio encoding rate are 4 M [bits/s] and 384 k [bits/s], the schedule data is data for causing the transport stream generating apparatus to perform the following multiplexing control process. In 107 transport packets, PAT data, PMT data, and PCR data are transmitted as the 1-st transport packet, the 2-nd transport packet, and the 3-rd transport packet, respectively. Around a half of data of an encoded video stream is transmitted as the 4-th to 49-th transport packets. Around a half of data of an encoded audio stream is transmitted as the 50-th to 54-th transport packets. Around a half of private data is transmitted as the 55-th transport packet. A half of null data is transmitted as the 56-th transport packet. The remaining half of the data of the encoded video stream is transmitted as the 57-th to 101-st transport packets. The remaining half of the data of the encoded audio stream is transmitted as the 102-nd to 105-th transport packets. The remaining half of the private data is transmitted as the 106-th transport packet. The remaining half of the null data is transmitted as the 107-th transport packet.

The CPU 39 stores the generated schedule data to the control data RAM 41.

At step S13, the CPU 39 multiplexes an encoded video stream and an encoded audio stream corresponding to the schedule data generated at step S12 so as to generate a transport stream. In addition, the CPU 39 simulates remaining data in the video STD buffer and the audio STD buffer of the decoder in the case that the transport stream is transmitted to the encoder.

At step S14, the CPU 39 determines whether the video STD buffer and the audio STD buffer of the decoder do not overflow corresponding to the simulated result obtained at step S13. When the determined result at step S14 is Yes (namely, both the video STD buffer and the audio STD buffer of the decoder do not overflow), the flow advances to step S15.

When the determined result as step S14 is No (namely, video STD buffer and the audio STD buffer of the decoder overflow), the flow returns to step S12. At step S12, the CPU 39 generates another multiplexing schedule data. Assuming that the former multiplexing schedule data is data of which an encoded video stream and an encoded audio stream are multiplexed as two portions each, the new multiplexing schedule data may be data of which an encoded video stream and an encoded video stream are multiplexed as three portions each. Steps S12, S13, and S14 are repeated until the determined result at step S14 becomes "Yes".

At step S15, the CPU 39 determines whether or not the user has assigned an encoding process for encoding source video data and source audio data.

At step S16, the CPU 39 performs a multiplexing process for multiplexing PCR data, PAT data, PMT data, an encoded video stream, an encoded audio stream, private data, and null data corresponding to the schedule data stored in the RAM 41.

At step S17, the CPU 39 generates a transport stream with the multiplexed stream of various data of PCR data, PAT data, PMT data, an encoded video stream, an encoded audio stream, private data, and null data.

At step S18, the CPU 39 increments the frame variable "n". Thereafter, the flow returns to step S16. At step S16, the CPU 39 performs the process for the next video frame period.

In other words, before performing the multiplexing process (at step S16), the CPU 39 controls each circuit so as to generate multiplexing schedule data (at step S12) and perform the multiplexing process (at step S16) and the transport generating process (at step S17) for each video frame. Thus, the transport stream generating apparatus according to the present invention does not need to generate a multiplexing schedule for each video frame period unlike with the conventional apparatus. Instead, the transport stream generating apparatus according to the present invention generates multiplexing schedule data one time. Thus, the time period necessary for generating a transport stream can be remarkably decreased. Consequently, the transport stream generating apparatus according to the present invention can transmit a live video program without a delay.

Figure 11B:
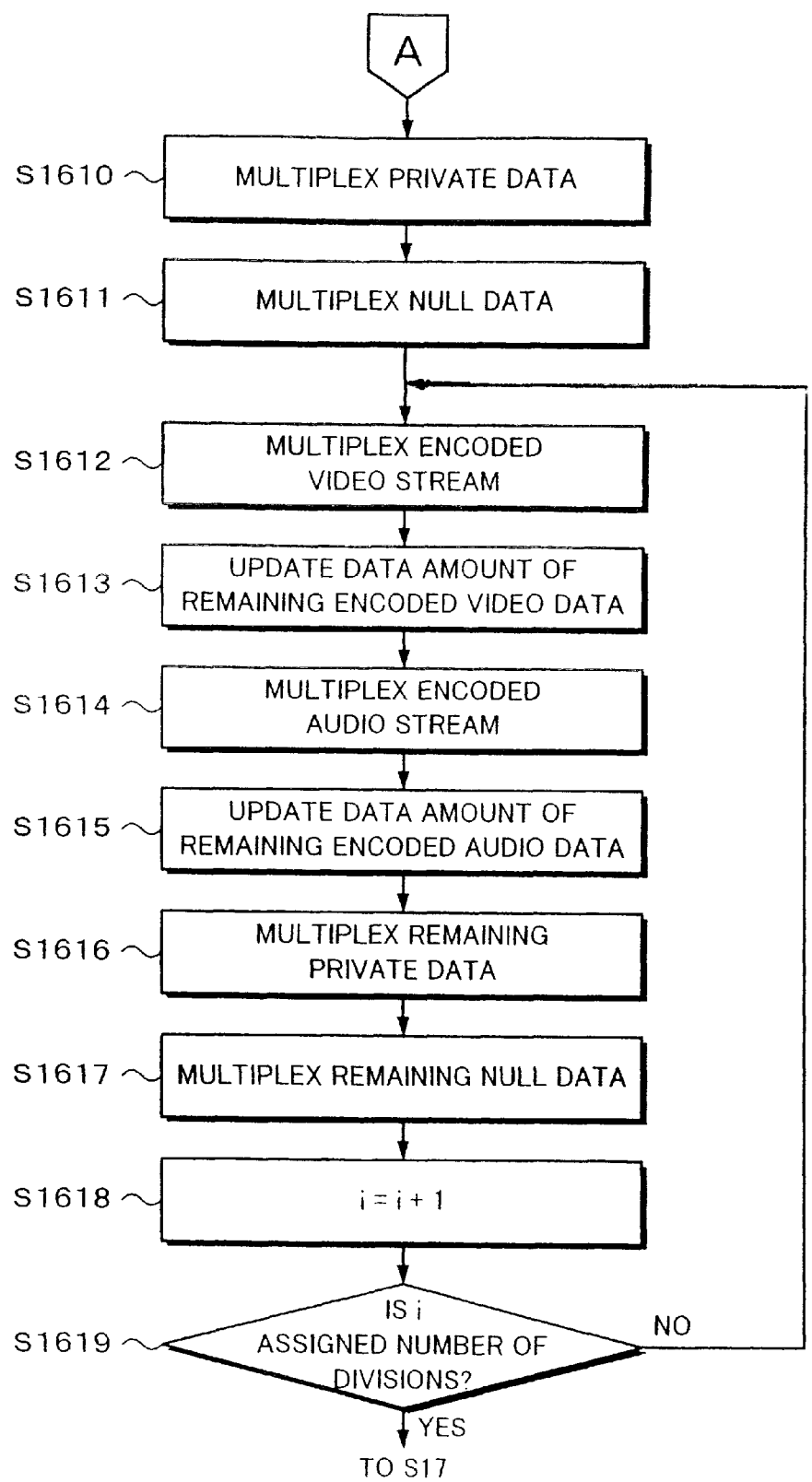

Next, with reference to a flow chart shown in FIG. 11, the multiplexing process (at step S16) will be described in detail. Due to a limited space, FIG. 11 is divided into FIG. 11A and FIG. 11B. FIG. 11 is a flow chart for explaining the multiplexing process at step S16 in detail.

At step S1600, the CPU 39 sets a division variable "i" to "1". The division variable is data that represents the number of portions into which each of an encoded video stream and an encoded audio stream is divided in one video frame period. In the example shown in FIG. 9, the division variable "i" is "2".

At step S1601, the CPU 39 causes the terminal c of the multiplexer 36 to be selected in the period from the 1-st to 3-rd transport packets corresponding to the schedule data stored in the RAM 41 so as to output PAT data, PMT data, and PCR data. Thus, in the period for the 1-st transport packet, PAT data is multiplexed. In the period for the 2-nd transport packet, PMT data is multiplexed. In the period for the 3-rd transport packet, PCR data is multiplexed.

At step S1602, the CPU 39 receives the data amount (field_bit_size [bits]) of the encoded video stream per field from the video encoder 31 through the interface 42.

At step S1603, the CPU 39 obtains the total data amount of the data buffered in the encoder FIFO buffer 33. In reality, after the encoder FIFO buffer 33 has buffered an encoded video stream in the n-th frame period (current frame period), the CPU 39 obtains the total data amount of the encoder FIFO buffer 33. Assuming that the data amount of the remaining video data that remains in the encoder FIFO buffer 33 in the (n-1)-th frame period (past frame period) is represented by frame_bit_remain [bits], the total data amount (frame_bit_total [bits]) of the encoder FIFO buffer 33 is expressed as follows.

frame_bit_total [bits]
=field_bit_size [bits] =2+
frame_bit_remain [bits]

At step S1604, the CPU 39 causes the terminal a of the multiplexer 36 to be selected in the period from the 4-th to 49-th transport packets corresponding to the schedule data stored in the RAM 41 so as to output an encoded video stream as the 4-th to 49-th transport packets. Thus, the encoder FIFO buffer 33 outputs the encoded video data in the period from the 4-th to 49-th transport packets. The size (out_video_size [bits]) of the encoded video data that is output from the encoder FIFO buffer 33 in the period from the 4-th to 49-th transport packets is expressed as follows.

out_video_size [bits]=46 packets×184 bytes×8 bits
=67712 bits

At step S1605, the CPU 39 calculates the data amount of the remaining encoded video data that remains in the encoder FIFO buffer 33. Since the encoded video data buffered in the encoder FIFO buffer 33 has been read at step S1604, the data amount (frame_bit_remain [bits]) of the remaining encoded video data that remains in the encoder FIFO buffer 33 is decreased. Thus, the data amount (frame_bit_remain [bits]) of the remaining encoded video data is expressed as follows.

frame_bit_remain [bits]
=frame_bit_total [bits]−out_video_size [bits]

At step S1606, the CPU 39 receives the data amount (field_bit_size [bits]) per field of the encoded audio stream from the audio encoder 32 through an interface.

At step S1607, after the encoder FIFO buffer 34 has buffered the encoded audio stream in the n-th frame period, the CPU 39 obtains the total data amount of the encoder FIFO buffer 34. Assuming that the data amount of the remaining audio data that remains in the encoder FIFO buffer 34 in the (n-1)th frame period is represented by frame_bit_remain [bits], the total data amount (frame_bit_total [bits]) of the audio data that remains in the encoder FIFO buffer 34 is expressed as follows.

frame_bit_total [bits]
=field_bit_size [bits]×2+frame_bit_remain [bits]

At step S1608, the CPU 39 causes the terminal b of the multiplexer 36 to be selected in the period from the 50-th to 54-th transport packets corresponding to the schedule data stored in the RAM 41 so as to output an encoded audio data as the 50-th to 54-th transport packets. Thus, the encoder FIFO buffer 34 outputs the encoded audio stream in the period from the 50-th to 54-th transport packets. The size (out_audio_size [bits]) of the encoded audio data that is output from the encoder FIFO buffer 34 in the period from the 50-th to 54-th transport packets is expressed as follows.

out_audio_size [bits]=5 packets×184 bytes×8 bits=7360 bits

At step S1609, the CPU 39 obtains the data amount (frame_bit_remain [bits]) of the remaining encoded audio data that remains in the encoder FIFO buffer 34. Since the encoded audio data buffered in the encoder FIFO buffer 34 has been read at step S1608, the data amount of the remaining audio data that remains in the encoder FIFO buffer is decreased. Thus, the data amount (frame_bit_remain [bits]) of the remaining encoded audio data is expressed as follows.

frame_bit_remain [bits]
=frame_bit_total [bits]−out_audio_size [bits]

At step S1610, the CPU 39 causes the terminal c of the multiplexer 36 to be selected in the period for the 55-th transport packet corresponding to the schedule data stored in the RAM 41 so as to output private data. Thus, the private data is multiplexed in the period for the 55-th transport packet.

At step S1611, the CPU 39 causes the terminal c of the multiplexer 36 to be selected in the period for the 56-th transport packet corresponding to the schedule data stored in the RAM 41 so as to output null data. Thus, in the period for the 56-th transport packet, the null data is multiplexed. Consequently, the data amount of the transport stream becomes constant in each video frame.

At step S1612, the CPU 39 causes the terminal a of the multiplexer 36 to be selected in the period from the 57-th to 101-st transport packets corresponding to the schedule data stored in the RAM 41 so as to output an encoded video stream as the 57-th to 101-st transport packets. Thus, the encoder FIFO buffer 33 outputs the encoded video data in the period from the 57-th to 101-th transport packets. The size (out_video_size [bits]) of the encoded video data that is output from the encoder FIFO buffer 33 in the period from the 57-th to 101-st transport packets is expressed as follows.

out_video_size [bits]=45 packets×184 bytes×8 bits
=66240 bits

At step S1613, the CPU 39 updates data (frame_bit_remain [bits]) that represents the data amount of the remaining encoded video data that remains in the encoder FIFO buffer 33. In other words, since the encoded video data buffered in the encoder FIFO buffer 33 has been read at step S1612, the data amount (frame_bit_remain [bits]) of the remaining encoded video data that remains in the encoder FIFO buffer 33 is decreased. Since the data amount of the remaining encoded video data that remains in the encoder FIFO buffer 33 has been obtained before step S1612 with the data amount (frame_bit_remain [bits]) of the remaining encoded video data that remains in the encoder FIFO buffer 33 at step S1605, the data amount (frame_bit_remain [bits]) of the remaining encoded video data that is updated is expressed as follows.

frame_bit_remain [bits]
=frame_bit_remain [bits]−out_video_size [bits]

At step S1614, the CPU 39 causes the terminal b of the multiplexer 36 to be selected in the period from the 102-nd to 105-th transport packets corresponding to the schedule data stored in the RAM 41 so as to output an encoded audio stream as the 102-nd to 105-th transport packets. Thus, the encoder FIFO buffer 34 outputs the encoded audio data in the period from the 102-nd to 105-th transport packets. The size (out_audio_size [bits]) of the encoded audio data that is output from the encoder FIFO buffer 34 in the period from the 102-nd to 105-th transport packets is expressed as follows.

out_audio_size [bits]=4 packets×184 bytes×8 bits
=5888 bits

At step S1615, the CPU 39 updates the data amount (frame_bit_remain [bits]) of the remaining encoded audio data that remains in the encoder FIFO buffer 34. In other words, since the encoded audio data buffered in the encoder FIFO buffer 34 has been read at step S1614, the data amount (frame_bit_remain [bits]) that remains in the encoder FIFO buffer 34 is decreased. Since the data amount of the remaining encoded video data that remains in the encoder FIFO buffer 34 has been obtained before step S1614 with the data amount (frame_bit_remain [bits]) of the remaining encoded audio data that remains in the encoder FIFO buffer 34 at step S1609, the data amount (frame_bit_remain [bits]) of the remaining encoded audio data that is newly updated is expressed as follows.

frame_bit_remain [bits]
=frame_bit_total [bits]−out_audio_size [bits]

At step S1616, the CPU 39 causes the terminal c of the multiplexer 36 to be selected in the period for the 106-th transport packet corresponding to the schedule data stored in the RAM 41 so as to output the remaining private data. Thus, in the period for the 106-th transport packet, the remaining private data is multiplexed.

At step S1617, the CPU 39 causes the terminal c of the multiplexer 36 to be selected in the period for the 107-th transport packet corresponding to the schedule data stored in the RAM 41 so as to output the remaining null data. Thus, in the period for the 107-th transport packet, the remaining null data is multiplexed. Consequently, the data amount of the transport stream becomes constant in each video frame.

At step S1618, the CPU 39 increments the division variable "i". Thereafter, the flow advances to step S1619.

At step S1619, when the division variable "i" is the assigned number of divisions, the flow returns to step S17. When the division variable "i" is not the assigned number of divisions, the flow returns to step S1612.

Figure 12:
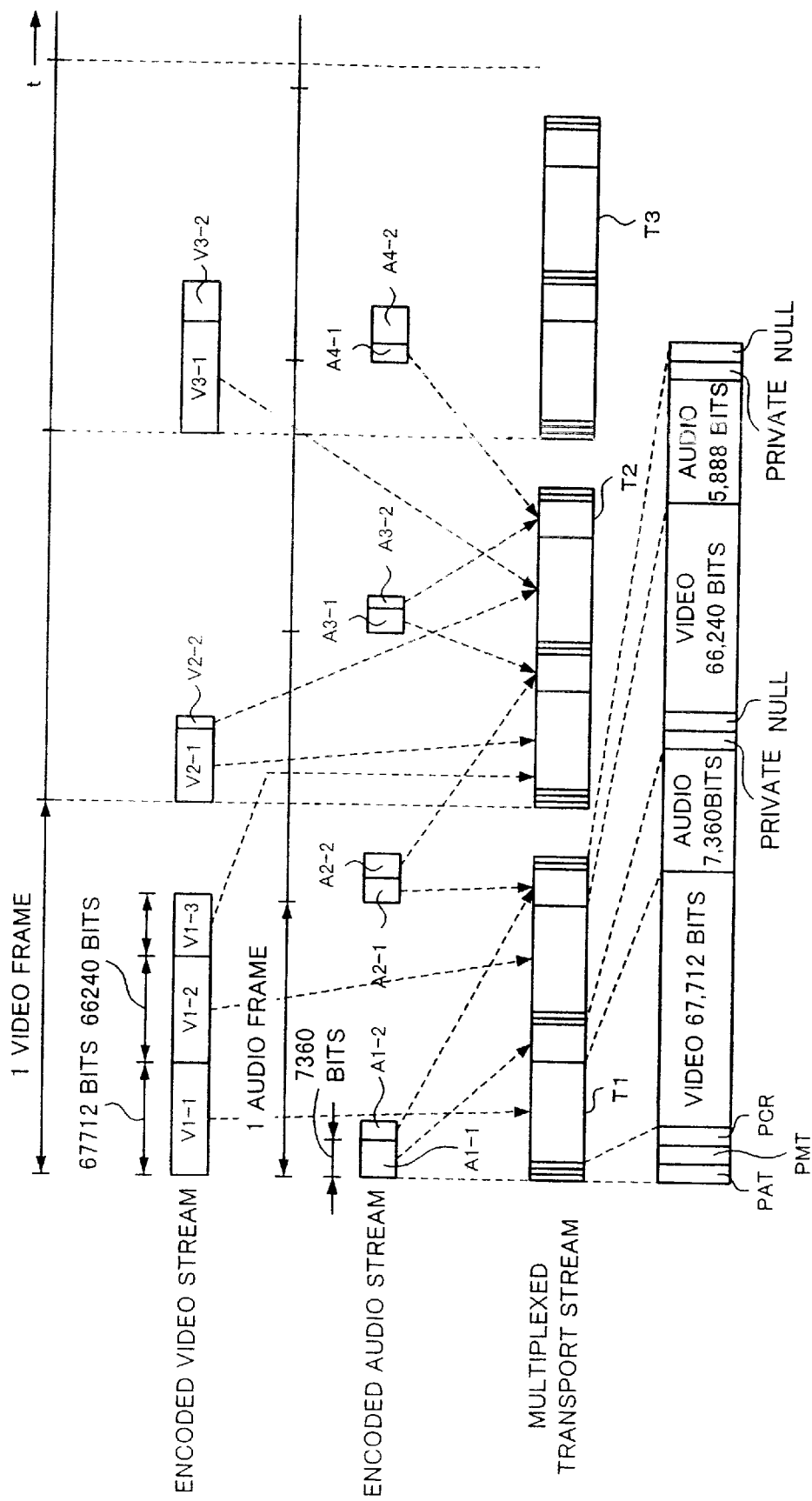
FIG. 12 is a timing chart for the transport stream generating process.
Figure 13:
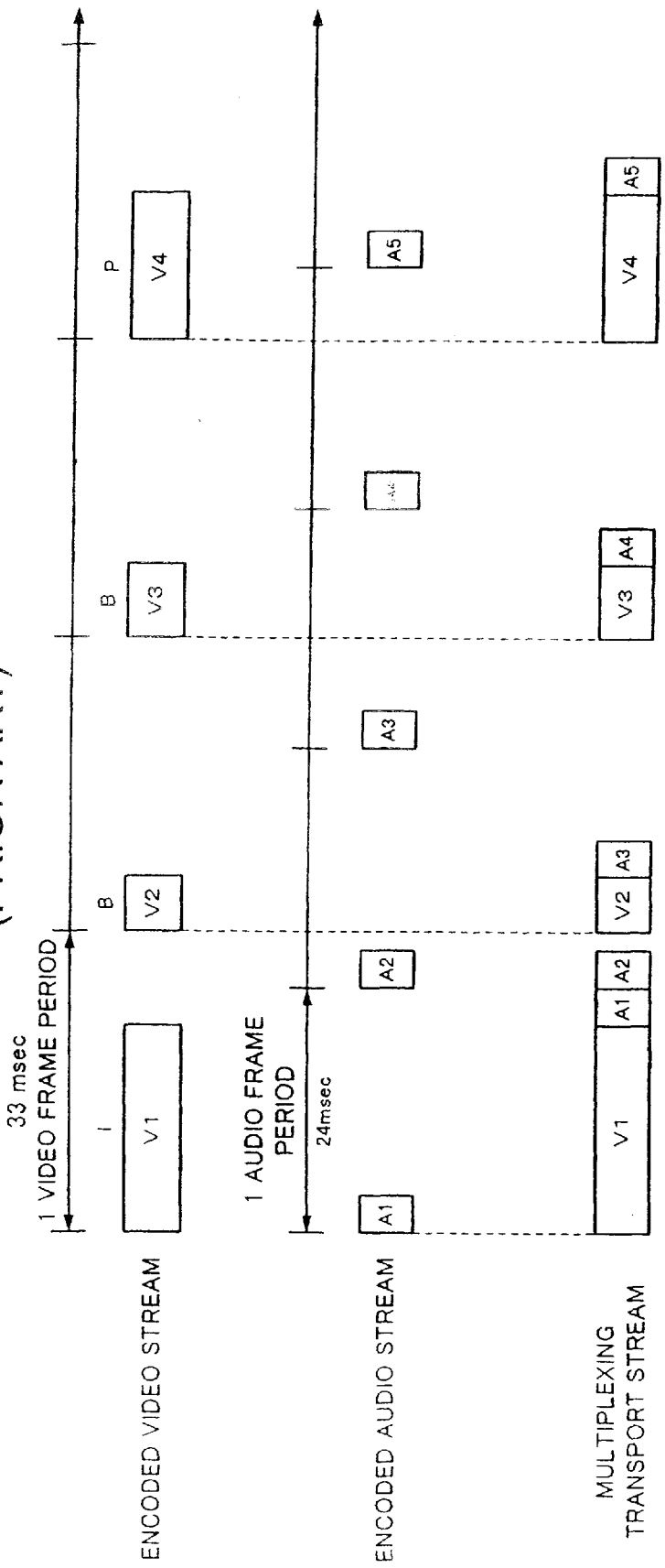
FIG. 13 is a timing chart for explaining a conventional transport stream generating process.

Next, with reference to an example shown in FIG. 12, a method for generating a transport stream corresponding to the multiplexing schedule will be theoretically described.

When the data amount of an encoded video stream that is output from the video encoder 31 is large, the encoded video stream is not multiplexed as one transport stream. For example, a first encoded video stream generated in a first video frame period is multiplexed as a first stream portion V1-1 (67712 bits), a second stream portion (66240 bits), and a third stream portion VI-3. Since the first stream portion V1-1 is transmitted with first 46 transport packets (67712 bits) of the first transport stream T1 corresponding to the above-described scheduling data, the size of the first stream portion V1-1 is 67712 bits. Likewise, since the second stream portion V1-2 is transmitted with the last 45 transport packets (66240 bits) of the first transport stream T1, the size of the second stream portion V1-2 is 66240 bits.

Since 91 transport packets for transmitting the video stream of the first transport stream are used to transmit the first stream portion V1-1 and the second stream portion V1-2, transport packets of the first transport stream T1 cannot be used to transmit the third stream portion V1-3. In the transport stream generating apparatus according to the present invention, the third stream portion V1-3 is not transmitted as the first transport stream T1. Instead, the third stream portion V1-3 is transmitted with part of the first 46 transport packets of the second transport stream T2.

The first stream portion V2-1 in the second video frame period is transmitted with the first 46 transport packets of the second transport stream T2 along with the third stream portion V1-3 in the first video frame period. In other words, the total of the data size of the third stream portion V1-3 that remains in the encoder FIFO buffer 3 in the first video frame period and the data size of the first stream portion V2-1 newly stored to the buffer in the second video period becomes 67712 bits. Likewise, the second stream portion V2-2 in the second video frame period and the first stream portion V3-1 in the third video frame period are transmitted with the last 45 transport packets in the second transport stream.

Next, an audio stream will be described.

A first encoded audio stream that is output in the first audio frame period is transmitted as a first stream portion A1-1 (7360 bits) and a second stream portion A1-2. Since the first stream portion A1-1 is transmitted with the first five transport packets (7360 bits) of the first transport stream T1, the size of the first stream portion A1-1 is 7360 bits.

Since the first five transport packets of nine transport packets for transmitting the audio stream of the first transport stream T1 are used to transmit the first stream portion A1-1, the second stream portion A1-2 is transmitted with the last five transport packets.

As with the second stream portion A1-2 of the first audio frame, the first stream portion A2-1 of the second audio frame is transmitted with the last five transport packets. Thus, the total of the data amount of the second stream portion A1-2 of the first audio frame and the data amount of the first stream portion A2-1 of the second audio frame becomes the data amount of four transport packets (588 bits).

Likewise, the second stream portion A2-2 of the second audio frame, the first stream portion A3-1 and the second stream portion A3-2 of the third audio frame, and the first stream portion A4-1 and the second stream portion A4-2 of the fourth audio frame are transmitted with transport packets of the transport stream.

As described above, in the transport stream generating apparatus according to the present invention, schedule data used in common with each video frame is generated. With the schedule data, the data amount of each of an encoded video stream and an encoded audio stream in one video frame period is constant. Thus, it is not necessary to perform a simulation for determining whether or not an STD buffer overflows for each frame. Consequently, programs can be multiplexed on real time basis.

In the transport stream generating apparatus according to the present invention, each of the data amount of an encoded video stream multiplexed in one video frame and the data amount of an encoded audio frame multiplexed in a predetermined period is almost constant in any video frame period. In addition, the data amount of a transport stream generated in one video frame period is almost constant in any video frame period.

Thus, the data amount of a transport stream that is output from the transport stream generating apparatus is constant in any frame period. Consequently, in the transport stream generating apparatus according to the present invention, it is not necessary to perform a simulation for determining whether or not a STD buffer of a decoding unit overflows. Thus, the transport stream generating apparatus according to the present invention can generate a transport stream faster than the conventional apparatus that requires a simulation. In addition, the apparatus according to the present invention can generate a transport stream on real time basis.

In the transport stream generating apparatus according to the present invention, schedule data for multiplexing an encoded video stream and an encoded audio stream is generated corresponding to a target video encoding rate and a target audio encoding rate. When an encoded video stream and an encoded audio stream are multiplexed corresponding to the generated schedule data and the multiplexed stream is transmitted as a transport stream to a decoding unit, the multiplexing process is performed in such a manner that the SDT buffer of the decoding unit does not overflow. Thus, in the transport stream generating apparatus according to the present invention, such schedule data is generated. In any video frame period, the multiplexing process is performed corresponding to the schedule data. Thus, the SDT buffer of the decoding unit is easily prevented from overflowing. In other words, unlike with the conventional apparatus, in the transport stream generating apparatus according to the present invention, it is not necessary to perform a complicated process such as a simulation corresponding to a planed schedule for each video frame.

In the transport stream generating apparatus according to the present invention, the schedule data is generated so that each of the data amount of an encoded video stream multiplexed in one video frame and the data amount of an encoded audio stream multiplexed in a predetermined period is almost constant in any video frame period and that the data amount of a transport stream generated in one video frame is almost constant in any video frame period. In other words, in the transport stream generating apparatus according to the present invention, the multiplexing process can be performed corresponding to the schedule data with preventing the STD buffer of the decoding unit from overflowing.

What is claimed is:

1. A transport stream generating apparatus for generating a transport stream for transmitting source video data and source audio data, comprising:

encoding means for encoding source video data and source audio data corresponding to an assigned video encoding rate and an assigned audio encoding rate so as to generate an encoded video stream and an encoded audio stream, respectively;

multiplexing means for multiplexing the encoded video stream and the encoded audio stream in each of at least one predetermined period;

transport stream generating means for generating the transport stream with the multiplexed stream of the video stream and the audio stream;

controlling means for controlling said encoding means, said multiplexing means, and said transport stream generating means so that each of a data amount of the encoded video stream multiplexed in a predetermined period and a data amount of the encoded audio stream multiplexed in the predetermined period is near constant for all predetermined periods; the predetermined period being one video frame period;

said controlling means comprising means for generating a schedule corresponding to the assigned video encoding rate and the assigned audio encoding rate so as to multiplex the encoded video stream and the encoded audio stream;

said controlling means controlling said multiplexing means and said transport stream generating means so as to perform a multiplexing process corresponding to the schedule for all predetermined periods; and said controlling means calculating the data amount of the encoded video stream transmitted in one video frame period corresponding to the assigned video encoding rate, calculating the data amount of the encoded audio stream transmitted in one audio frame period corresponding to the assigned audio encoding rate, and generating the schedule corresponding to the data amount of the calculated encoded video stream and the data amount of the calculated audio stream.

2. The transport stream generating apparatus as set forth in claim 1, further comprising:

video encoder buffering means for buffering the encoded video stream outputted from said encoding means; and audio encoder buffering means for buffering the encoded audio stream outputted from said encoding means;

wherein, when a cumulative data amount of a remaining data amount of the video encoder buffering means as an (n-1)th transport stream of the encoded video stream in an (n-1)th video frame period and the data amount of the encoded video stream outputted from said encoding means as the encoded video stream in an n-th video frame period is larger than the data amount of the encoded video stream of one transport stream defined in the schedule, said controlling means controls said multiplexing means and said transport stream generating means so as to multiplex the remaining data in the n-th video frame period and the first half of the data of the encoded video stream in the (n+1)th video frame period as a transport stream in the n-th video frame period and multiplex the remaining data of the encoded video stream in the n-th video frame period as a transport stream in the (n+1)th video frame period.

3. The transport stream generating apparatus as set forth in claim 1, further comprising:

video encoder buffering means for buffering the encoded video stream outputted from said encoding means; and audio encoder buffering means for buffering the encoded audio stream outputted from said encoding means, wherein:

said controlling means controls a data amount of the encoded video stream from the video encoder buffering means in the current video frame period corresponding to a data amount of video data that remains in the video encoder buffering means as a result of a transport stream generating process in a preceding video frame period and corresponding to the data amount of an encoded video stream from said encoding means in the current video frame period; and said controlling means controls the data amount of the encoded audio stream from the audio encoder buffering means in the current video frame period corresponding to the data amount of audio data that remains in the audio encoder buffering means as the result of a transport stream generating process in the preceding video frame period and corresponding to the data amount of an encoded audio stream from said encoding means in the current video frame period.

4. A transport stream generating apparatus for generating a transport stream for transmitting source video data and source audio data, comprising:

encoding means for encoding source video data and source audio data corresponding to an assigned video encoding rate and an assigned audio encoding rate so as to generate an encoded video stream and an encoded audio stream, respectively;

multiplexing means for multiplexing the encoded video stream and the encoded audio stream in each of at least one predetermined period;

transport stream generating means for generating the transport stream with the multiplexed stream of the video stream and the audio stream;

controlling means for controlling said encoding means, said multiplexing means, and said transport stream generating means so that each of a data amount of the encoded video stream multiplexed in a predetermined period and a data amount of the encoded audio stream multiplexed in the predetermined period is near constant for all predetermined periods; the predetermined period being one video frame period;

said controlling means comprising means for generating a schedule corresponding to the assigned video encoding rate and the assigned audio encoding rate so as to multiplex the encoded video stream and the encoded audio stream;

said controlling means controlling said multiplexing means and said transport stream generating means so as to perform a multiplexing process corresponding to the schedule for all predetermined periods; and said controlling means calculating a number of transport packets necessary for transmitting the encoded video stream corresponding to the assigned video encoding rate, calculating a number of transport packets necessary for transmitting the encoded audio stream corresponding to the assigned audio encoding rate, and generating the schedule corresponding to a number of transport packets for the encoded video stream and a number of the transport packets for the encoded audio stream.

5. The transport stream generating apparatus as set forth in claim 4, further comprising:

video encoder buffering means for buffering the encoded video stream from said encoding means; and audio encoder buffering means for buffering the encoded audio stream from said encoding means, wherein when a cumulative data amount of a remaining data amount of the video encoder buffering means as an (n-1)th transport stream of an encoded video stream in an (n-1)th video frame period and a data amount of an encoded video stream that is output from said encoding means as an encoded video stream in an n-th video frame period is larger than a data amount of an encoded video stream of one transport stream defined in the schedule, said controlling means controls said multiplexing means and said transport stream generating means so as to multiplex remaining data in the (n-1)th video frame period and the first half of the data of the encoded video stream in the n-th video frame period as a transport stream in the n-th video frame period and multiplex the remaining data of the encoded video stream in the n-th video frame period as a transport stream in the (n+1)th video frame period.

6. The transport stream generating apparatus as set forth in claim 4, further comprising:

video encoder buffering means for buffering the encoded video stream outputted from said encoding means; and audio encoder buffering means for buffering the encoded audio stream outputted from said encoding means, wherein:

said controlling means controls a data amount of the encoded video stream from the video encoder buffering means in the current video frame period corresponding to a data amount of video data that remains in the video encoder buffering means as a result of a transport stream generating process in a preceding video frame period and corresponding to the data amount of an encoded video stream from said encoding means in the current video frame period; and said controlling means controls the data amount of the encoded audio stream from the audio encoder buffering means in the current video frame period corresponding to the data amount of audio data that remains in the audio encoder buffering means as the result of a transport stream generating process in the preceding video frame period and corresponding to the data amount of an encoded audio stream from said encoding means in the current video frame period.

7. A transport stream generating method of generating a transport stream for transmitting source video data and source audio data, comprising the steps of:

an encoding step of encoding source video data and source audio data corresponding to an assigned video encoding rate and an assigned audio encoding rate so as to generate an encoded video stream and an encoded audio stream, respectively;

a schedule generating step of generating a schedule corresponding to the assigned video encoding rate and the assigned audio encoding rate so as to multiplex the encoded video stream and the encoded audio stream;

a multiplexing step of multiplexing the encoded video stream and the encoded audio stream in each of at least one predetermined period in accordance with the generated schedule; a predetermined period being one video frame period; and a transport stream generating step of generating the transport stream with the multiplexed stream of the video stream and the audio stream;

the schedule generating step being performed by calculating a data amount of the encoded video stream transmitted in one video frame period corresponding to the assigned video encoding rate, calculating a data amount of the encoded audio stream transmitted in one audio frame period corresponding to the assigned audio encoding rate, and generating the schedule corresponding to the data amount of the calculated encoded video stream and the data amount of the calculated encoded audio stream.

8. The transport stream generating method as set forth in claim 7, wherein when a cumulative data amount of a remaining data amount in an encoder buffer for an (n-1)th transport stream of an encoded video stream in an (n-1)th video frame period and a data amount of an encoded video stream as an encoded video stream in an n-th video frame period is larger than a data amount of an encoded video stream of one transport stream defined in the schedule, the multiplexing step is performed by multiplexing remaining data in the (n-1)th video frame period and the first half of the data of the encoded video stream in the n-th video frame period as a transport stream in the n-th video frame period and multiplexing the remaining data of the encoded video stream in the n-th video frame period as a transport stream in the (n+1)th video frame period.

9. The transport stream generating method as set forth in claim 7, wherein the multiplexing step is performed by controlling the data amount of the encoded video stream from a video encoder buffer in the current video frame period corresponding to a data amount of video data that remains in the video encoder buffer as a result of a transport stream generating process in a preceding video frame period and corresponding to the data amount of an encoded video stream in the current video frame period, and controlling the data amount of the encoded audio stream from an audio encoder buffer in the current video frame period corresponding to a data amount of audio data that remains in the audio encoder buffer as the result of a transport stream generating process in the preceding video frame period and corresponding to the data amount of an encoded audio stream in the current video frame period.

10. A transport stream generating method of generating a transport stream for transmitting source video data and source audio data, comprising the steps of:

an encoding step of encoding source video data and source audio data corresponding to an assigned video encoding rate and an assigned audio encoding rate so as to generate an encoded video stream and an encoded audio stream, respectively;

a schedule generating step of generating a schedule corresponding to the assigned video encoding rate and the assigned audio encoding rate so as to multiplex the encoded video stream and the encoded audio stream;

a multiplexing step of multiplexing the encoded video stream and the encoded audio stream in each of at least one predetermined period in accordance with the generated schedule; a predetermined period being one video frame period; and a transport stream generating step of generating the transport stream with the multiplexed stream of the video stream and the audio stream;

the schedule generating step being performed by calculating a number of transport packets necessary for transmitting the encoded video stream corresponding to the assigned video encoding rate, calculating a number of transport packets necessary for transmitting the encoded audio stream corresponding to the assigned audio encoding rate, and generating the schedule corresponding to the number of transport packets for the encoded video stream and the number of the transport packets for the encoded audio stream.

* * * * *